United States Patent
Xie et al.

(10) Patent No.: US 12,174,478 B2
(45) Date of Patent: Dec. 24, 2024

(54) DISPLAY PANEL, DISPLAY MODULE AND DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Jianyun Xie, Beijing (CN); Peng Liu, Beijing (CN); Jingyi Xu, Beijing (CN); Hong Liu, Beijing (CN); Peirong Huo, Beijing (CN); Zhiming Li, Beijing (CN); Guodong Wang, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/014,189

(22) PCT Filed: May 11, 2022

(86) PCT No.: PCT/CN2022/092299
§ 371 (c)(1),
(2) Date: Jan. 3, 2023

(87) PCT Pub. No.: WO2023/216160
PCT Pub. Date: Nov. 16, 2023

(65) Prior Publication Data
US 2023/0400726 A1    Dec. 14, 2023

(51) Int. Cl.
*G02F 1/1333* (2006.01)
*G02F 1/1343* (2006.01)

(52) U.S. Cl.
CPC .. *G02F 1/133382* (2013.01); *G02F 1/134309* (2013.01)

(58) Field of Classification Search
None
See application file for complete search history.

(56) References Cited

U.S. PATENT DOCUMENTS 10,795,199 B2    10/2020   Zhao et al.
11,353,735 B2     6/2022   Lin et al.
(Continued)

FOREIGN PATENT DOCUMENTS

CN    2323434 Y    6/1999
CN    103631044 A  3/2014
(Continued)

OTHER PUBLICATIONS

Written Opinion from PCT/CN2022/092299 dated Dec. 8, 2022.

*Primary Examiner* — Phu Vu
(74) *Attorney, Agent, or Firm* — Calfee, Halter & Griswold LLP

(57) ABSTRACT

A display panel relates to the field of display technology, and includes: a first base substrate and a second base substrate arranged oppositely; a liquid crystal layer and a plurality of conductive layers, wherein the liquid crystal layer and the plurality of conductive layers are located between the first base substrate and the second base substrate; and a plurality of heating elements, wherein the plurality of heating elements are distributed in at least one of the conductive layers.

20 Claims, 13 Drawing Sheets

(56) References Cited

U.S. PATENT DOCUMENTS

| | | | |
|---|---|---|---|
| 2011/0069092 A1 | 3/2011 | Furukawa | |
| 2014/0055696 A1* | 2/2014 | Lee | G02F 1/133305 349/20 |
| 2015/0138462 A1 | 5/2015 | Yang et al. | |
| 2016/0023606 A1 | 1/2016 | Krebs | |
| 2018/0314118 A1* | 11/2018 | Itou | G02F 1/13439 |
| 2019/0353940 A1* | 11/2019 | Zhao | G02F 1/136286 |
| 2020/0073168 A1* | 3/2020 | Zhao | G02F 1/136286 |
| 2021/0048705 A1 | 2/2021 | Lin et al. | |
| 2021/0048706 A1* | 2/2021 | Saenger Nayver | G02F 1/13439 |

FOREIGN PATENT DOCUMENTS

| | | | | |
|---|---|---|---|---|
| CN | 103941463 A | * | 7/2014 | |
| CN | 108983476 A | | 12/2018 | |
| CN | 109031813 A | | 12/2018 | |
| CN | 109041308 A | | 12/2018 | |
| CN | 110297348 A | | 10/2019 | |
| CN | 110954229 A | | 4/2020 | |
| CN | 112394559 A | | 2/2021 | |
| CN | 109031813 B | | 4/2021 | |
| CN | 112965284 A | | 6/2021 | |
| CN | 113109963 A | * | 7/2021 | G02F 1/133382 |
| CN | 110954229 B | | 4/2022 | |
| CN | 113109963 B | | 8/2022 | |
| EP | 3617778 A1 | | 3/2020 | |
| EP | 3617778 B1 | | 12/2020 | |
| JP | 2010276972 A | | 12/2010 | |

\* cited by examiner

DISPLAY PANEL, DISPLAY MODULE AND DISPLAY DEVICE

CROSS REFERENCE

The present disclosure is a U.S. national phase application of International Application No. PCT/CN2022/092299, filed on May 11, 2022, which is incorporated herein by reference in its entirety.

TECHNICAL FIELD

The present disclosure relates to the field of display technology, and in particular, to a display panel, a display module and a display device.

BACKGROUND

The liquid crystal display is a non-self illuminated display, which requires a backlight module to achieve the display function through the backlight provided by the backlight module. However, at a special temperature, especially at a low temperature of tens of degrees below zero, a viscosity coefficient of the liquid crystal material increases and a response speed thereof slows down, making it impossible for the liquid crystal display to display normally.

Currently, a common solution for heating the liquid crystal display on the market are mainly an externally attached heating film or heating sheet. This solution is of high cost, poor yield, low heating efficiency, which also adversely affects the display effect of the display.

The information disclosed in above section is only for enhancement of understanding of the background of the present disclosure, and therefore may contain information that does not form the prior art already known to a person of ordinary skill in the art.

SUMMARY

The purpose of the present disclosure is to provide a display panel, a display module and a display device.

According to one aspect of the present disclosure, a display panel is provided. The display panel includes: a first base substrate and a second base substrate arranged oppositely; a liquid crystal layer and a plurality of conductive layers, wherein the liquid crystal layer and the plurality of conductive layers are located between the first base substrate and the second base substrate; and a plurality of heating elements, wherein the plurality of heating elements are distributed in at least one of the conductive layers.

In some exemplary embodiments of the present disclosure, the heating elements are distributed in at least two of the conductive layers, and among the heating elements distributed in different conductive layers, a heating element in at least one of the conductive layers is connected in parallel to a heating element in another one of the conductive layers.

In some exemplary embodiments of the present disclosure, the plurality of conductive layers include: a first conductive layer group including at least one of the conductive layers, wherein the first conductive layer group is arranged on a side of the liquid crystal layer close to the first base substrate; and a second conductive layer group including at least one of the conductive layers, wherein the second conductive layer group is arranged on a side of the liquid crystal layer away from the first base substrate; wherein the heating elements are distributed in the first conductive layer group and/or the second conductive layer group.

In some exemplary embodiments of the present disclosure, the display panel includes an active area and a peripheral area located at periphery of the active area, and the display panel further includes: a coupling lead, wherein the coupling lead is distributed in at least one of the plurality of conductive layers, and is located in the peripheral area; and a heating control unit configured to control turned-on or turned-off of the heating elements, wherein the coupling lead connects the heating elements and the heating control unit.

In some exemplary embodiments of the present disclosure, the plurality of conductive layers include a first conductive layer, a second conductive layer, a third conductive layer, a fourth conductive layer, a fifth conductive layer and a sixth conductive layer arranged in sequence in a direction away from the first base substrate; wherein the first conductive layer includes a shielding structure; the second conductive layer includes an active region of a transistor; the third conductive layer includes a gate of the transistor; the fourth conductive layer includes a source and a drain of the transistor; the fifth conductive layer includes a first electrode; the sixth conductive layer includes a second electrode, and the second electrode and the first electrode are configured to form an electric field for driving the liquid crystal layer; and wherein the heating elements are distributed in at least one of the conductive layers of six conductive layers composed of the first conductive layer, the second conductive layer, the third conductive layer, the fourth conductive layer, the fifth conductive layer and the sixth conductive layer.

In some exemplary embodiments of the present disclosure, the heating elements are distributed in at least two of the conductive layers of the six conductive layers composed of the first conductive layer, the second conductive layer, the third conductive layer, the fourth conductive layer, the fifth conductive layer and the sixth conductive layer, and a heating element in at least one of the conductive layers is connected in parallel to a heating element in another one of the conductive layers.

In some exemplary embodiments of the present disclosure, the plurality of conductive layers further include: a seventh conductive layer arranged between any two of the six conductive layers composed of the first conductive layer, the second conductive layer, the third conductive layer, the fourth conductive layer, the fifth conductive layer and the sixth conductive layer, or arranged on a side of the first conductive layer close to the first base substrate; wherein at least part of the heating elements are distributed in the seventh conductive layer.

In some exemplary embodiments of the present disclosure, a heating element distributed in the seventh conductive layer is connected in parallel to a heating element in at least one of the conductive layers of the six conductive layers composed of the first conductive layer, the second conductive layer, the third conductive layer, the fourth conductive layer, the fifth conductive layer and the sixth conductive layer.

In some exemplary embodiments of the present disclosure, the plurality of conductive layers further include: an eighth conductive layer arranged on a side of the liquid crystal layer away from the first base substrate; wherein at least part of the heating elements are distributed in the eighth conductive layer.

In some exemplary embodiments of the present disclosure, the display panel further includes: sealant sealed between the first base substrate and the second base substrate, wherein a conductive element is provided in the sealant, and a heating element distributed in the eighth conductive layer is connected to the heating control unit through the conductive element.

In some exemplary embodiments of the present disclosure, the heating element distributed in the eighth conductive layer is connected in parallel to a heating element in at least one of the six conductive layers composed of the first conductive layer, the second conductive layer, the third conductive layer, the fourth conductive layer, the fifth conductive layer and the sixth conductive layer.

In some exemplary embodiments of the present disclosure, the display panel includes a plurality of data lines and a plurality of scan lines, and the scan lines and the data lines intersect with each other and define a plurality of pixel areas; and wherein the plurality of heating elements extend in an extension direction of the scan lines, and are arranged in an arrangement direction of the scan lines; or the plurality of the heating elements extend in an extension direction of the data lines, and are arranged in an arrangement direction of the data lines.

In some exemplary embodiments of the present disclosure, when the heating elements extend in the extension direction of the scan lines, orthographic projections of the heating elements on the first base substrate at least partially overlap with orthographic projections of the scan lines on the first base substrate, or spacing between the orthographic projections of the heating elements on the first base substrate and the orthographic projections of the scan lines on the first base substrate is not greater than 20 μm; and when the heating elements extend in the extension direction of the data line, the orthographic projections of the heating elements on the first base substrate at least partially overlap with orthographic projections of the data lines on the first base substrate, or spacing between the orthographic projections of the heating elements on the first base substrate and the orthographic projections of the data lines on the first base substrate are not greater than 20 μm.

In some exemplary embodiments of the present disclosure, the first electrode or the second electrode has a plurality of slits, and each of the slits has a bending portion and is parallel to each other; wherein an extension direction of the heating elements is parallel to an arrangement direction of the slits, and orthographic projections of the heating elements on the first base substrate at least partially overlap with orthographic projections of bending portions on the first base substrate.

In some exemplary embodiments of the present disclosure, the display panel further includes: a color film layer arranged between the liquid crystal layer and the second base substrate, wherein the color film layer includes a shielding portion and a plurality of filter portions defined by the shielding portion, and the filter portions and the pixel areas are arranged in an one-to-one correspondence in a direction perpendicular to the first base substrate; wherein orthographic projections of the heating elements on the first base substrate are located within an orthographic projection of the shielding portion on the first base substrate.

In some exemplary embodiments of the present disclosure, orthographic projections of the heating elements distributed in different conductive layers on the first base substrate at least partially overlap with each other, and an overlapping ratio is not less than 90%.

In some exemplary embodiments of the present disclosure, among a plurality of heating elements distributed in the same conductive layer, at least part of the heating elements are connected in parallel or in series to form a heating unit.

In some exemplary embodiments of the present disclosure, among the plurality of heating elements distributed in the same conductive layer, at least every two of the heating elements are connected in parallel or in series.

In some exemplary embodiments of the present disclosure, the display panel has a central axis, and the central axis is perpendicular to the extension direction of the heating elements; and wherein each of the heating elements has a first end and a second end, the first end of each of the heating elements is located on one side of the central axis, the second end of each of the heating elements is located on the other side of the central axis, and the first end and the second end of the heating element are located in the peripheral area; and wherein among the plurality of heating elements distributed in the same conductive layer, the first ends and/or the second ends of at least two of the heating elements are connected to each other.

In some exemplary embodiments of the present disclosure, the coupling lead connects the heating unit and the heating control unit, and wherein coupling leads are distributed in at least two of the plurality of conductive layers, and the coupling leads distributed in different conductive layers are connected in parallel.

According to another aspect of the present disclosure, a display module is provided. The display module includes the display panel according to above aspects.

In some exemplary embodiments of the present disclosure, the display module further includes a temperature detection circuit, wherein the temperature detection circuit includes: a current input-output unit connected to a current switch control terminal, a current input terminal, a first node and a current output terminal, wherein the current input-output unit is configured to input current through the current input terminal, allow the current to flow through the first node, and output the current through the current output terminal, under a switch control signal from the current switch control terminal; and a temperature sensing unit connected to the first node, wherein the temperature sensing unit is integrated to the display panel, wherein the temperature sensing unit is configured to generate leakage current, and wherein the temperature sensing unit includes at least one PIN diode.

In some exemplary embodiments of the present disclosure, the current input-output unit include a first transistor and a second transistor, a first electrode of the first transistor is connected to the current input terminal, both a second electrode of the first transistor and a first electrode of the second transistor are connected to the first node, a second electrode of the second transistor is connected to the current output terminal, and both a gate of the first transistor and a gate of the second transistor are connected to the current switch control terminal; and wherein a first terminal of the PIN diode is connected to the first node, and a second terminal of the PIN diode is connected to a first supply voltage terminal.

In some exemplary embodiments of the present disclosure, the temperature detection circuit further includes: a first control unit connected to a signal control terminal, the first supply voltage terminal, a second supply voltage terminal and the current switch control terminal, wherein the first control unit is configured to output a voltage of the first supply voltage terminal or the second supply voltage terminal to the current switch control terminal under a control signal from the signal control terminal; and wherein the first control unit includes at least two inverters, an output terminal of a $k^{th}$ stage inverter is connected to an input terminal of a $(k+1)^{th}$ stage inverter, an input terminal of the first stage inverter is connected to the signal control terminal, and an output terminal of the last stage inverter is connected to the current switch control terminal, wherein k is a positive integer greater than or equal to 1.

In some exemplary embodiments of the present disclosure, the temperature detection circuit further includes: a second control unit connected to an output terminal of one of the inverters in the first control unit, the first supply voltage terminal and the first terminal of the PIN diode, wherein the second control unit is configured to apply a first supply voltage of the first supply voltage terminal to the first terminal of the PIN diode under a control signal from an output terminal of an inverter connected thereto.

According to another aspect of the present disclosure, a display device is provided. The display device includes the display module according to above aspects.

BRIEF DESCRIPTION OF THE DRAWINGS

The above and other features and advantages of the present disclosure will become more apparent from the detailed description of example embodiments with reference to the accompanying drawings.

Figure 1:
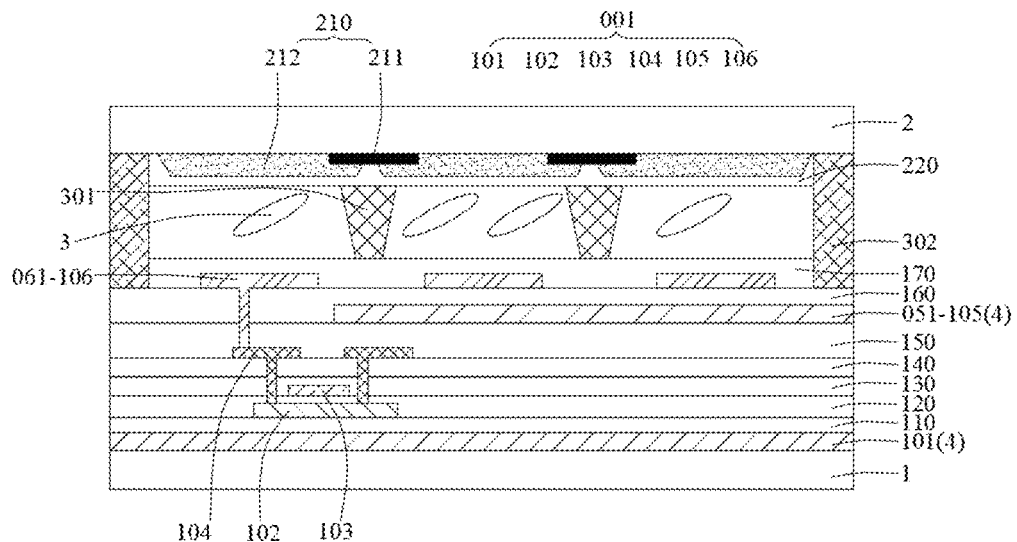
FIG. 1 is a schematic structural diagram of a display panel according to an exemplary embodiment of the present disclosure.

Reference numerals of main elements in the figures are as follows:

1—first base substrate; 001—first conductive layer group; 002—second conductive layer group; 101—first conductive layer; 102—second conductive layer; 103—third conductive layer; 104—fourth conductive layer; 105—fifth conductive layer; 051—first electrode; 106—sixth conductive layer; 061—second electrode; 611—bending portion; 107—seventh conductive layer; 108—eighth conductive layer; 110—buffer layer; 120—first gate insulating layer; 130—second gate insulating layer; 140—interlayer dielectric layer; 150—planarization layer; 160—passivation layer; 170—first alignment layer; 180—insulating layer; 2—second base substrate; 210—color film layer; 211—shielding portion; 212—filter portion; 220—second alignment layer; 3—liquid crystal layer; 301—spacer; 302—sealant; 303—conductive element; 004—heating unit; 4—heating element; 5—coupling lead; 6—heating control unit; 71—current input—output unit; N1—first node; In—current input terminal; Out—current output terminal; G1—switch control terminal; T1—first transistor; T2—second transistor; 72—temperature sensing unit; D1—first PIN diode; D2—second PIN diode; 73—first control unit; GATE—signal control terminal; VSS—first supply voltage terminal; VDD—second supply voltage terminal; 74—second control unit; T3—third transistor; DL—data line; GL—scan line; AA—active area; FA—peripheral area; FA1—binding area; 10—gate driver circuit; 20—touch assembly; 30—connecting line; 40—pad.

DETAILED DESCRIPTION

Exemplary embodiments will now be described more fully with reference to the drawings. However, exemplary embodiments can be implemented in various forms and should not be construed as limited to the examples set forth here. Instead, these embodiments are provided so that the present disclosure will be thorough and complete, and the concept of exemplary embodiments will be fully conveyed to those skilled in the art. The described features, structures, or characteristics may be combined in one or more embodiments in any suitable manner. In the following description, numerous specific details are provided so as to give a thorough understanding of the embodiments of the present disclosure.

In the figures, the thicknesses of areas and layers may be exaggerated for clarity. The same reference numerals in the figures represent the same or similar structures, and thus their detailed descriptions will be omitted.

The described features, structures, or characteristics may be combined in one or more embodiments in any suitable manner. In the following description, numerous specific details are provided so as to give a thorough understanding of the embodiments of the present disclosure. However, those skilled in the art will appreciate that, the technical solutions of the present disclosure may be practiced without one or more of these specific details, or other methods, components, materials, and the like may be employed. In other cases, well-known structures, materials, or operations are not shown or described in detail to avoid obscuring the main technical concept of the present disclosure.

When a certain structure is "on" other structures, it may mean that a certain structure is integrally formed on other structures, or that a certain structure is "directly" provided on other structures, or that a certain structure is "indirectly" provided on other structures through another structure.

Terms "a", "an" and "the" are used to indicate the presence of one or more elements/components/etc. Terms "include" and "comprise" are used to indicate an open-ended inclusion and mean that there may be additional elements/components/etc., in addition to the listed elements/components/etc. Terms "first", "second" and the like are used only as identifiers and are not limitation on the number of an object.

A liquid crystal display offers the possibility of its application to an electronic rear mirror due to the advantages of thin and light modules, fast response time of a screen and the like. However, the response time of the liquid crystal display at a low temperature is slow, which may cause problems such as smearing, delay and the like occurring in an image. Therefore, heating of the liquid crystal display is required. In the related art, solutions for heating the liquid crystal display are mainly an externally attached heating film or heating sheet. This solution is of high cost, poor yield, low heating efficiency, which also adversely affects the display effect of the display.

As shown in FIGS. 1 to 4, embodiments of the present disclosure provide a display panel, which includes a first base substrate 1 and a second base substrate 2 arranged oppositely, and a liquid crystal layer 3 and a plurality of conductive layers. The liquid crystal layer and a plurality of conductive layers are located between the first base substrate 1 and the second base substrate 2. The display panel further includes a plurality of heating elements 4, and the plurality of heating elements 4 are distributed in at least one of the plurality of conductive layers.

In the display panel provided by embodiments of the present disclosure, the plurality of heating elements 4 are provided between the first base substrate 1 and the second base substrate 2, and the plurality of heating elements 4 are distributed in at least one conductive layer. Compared with the heating element provided outside the display panel in the prior art, such an arrangement has higher resource utilization rate and better heating effect. In addition, the plurality of heating elements 4 can heat the display panel simultaneously or in sections, which facilitates improving the heating uniformity and the heating rate, so as to meet the heating requirement and improve the display quality.

Various components of the display panel provided by embodiments of the present disclosure will be described in detail below with reference to the drawings.

Embodiments of the present disclosure provide a display panel, and the display panel may be a display panel of a TFT-LCD (Thin Film Transistor Liquid Crystal Display).

As shown in FIGS. 1 to 4, the display panel includes the first base substrate 1 and the second base substrate 2 arranged opposite to each other, and the liquid crystal layer 3 and the plurality of conductive layers located between the first base substrate 1 and the second base substrate 2.

The first base substrate 1 and the second base substrate 2 may be base substrates made of inorganic materials, or may be base substrates made of organic materials. For example, in some embodiments of the present disclosure, materials of the first base substrate 1 and the second base substrate 2 may be a glass material such as soda-lime glass, quartz glass, sapphire glass, and the like, or may be a metal material such as stainless steel, aluminum, nickel, and the like. In some other embodiments of the present disclosure, materials of the first base substrate 1 and the second base substrate 2 may be polymethyl methacrylate (PMMA), polyvinyl alcohol (PVA), polyvinyl phenol (PVP), polyether sulfone (PES), polyimide, polyamide, polyacetal, poly carbonate (PC), polyethylene terephthalate (PET), polyethylene naphthalate (PEN) and combination thereof. The first base substrate 1 and the second base substrate 2 may also be flexible base substrates. For example, in some embodiments of the present disclosure, materials of the first base substrate 1 and the second base substrate 2 may be polyimide (PI). The first base substrate 1 and the second base substrate 2 may also be a composite of a multi-layer material. For example, in some embodiments of the present disclosure, the first base substrate 1 and the second base substrate 2 may include a bottom film, a pressure-sensitive adhesive layer, a first polyimide layer and a second polyimide layer stacked in sequence.

The liquid crystal layer 3 and the plurality of conductive layers are located between the first base substrate 1 and the second base substrate 2. The plurality of heating elements 4 are located in at least one of the plurality of conductive layers. The heating elements 4 can effectively heat the liquid crystal layer 3 when the heating elements are in an enabled state. Compared with the heating elements provided outside the display panel in the prior art, such arrangement has higher resource utilization rate and better heating effect.

In some embodiments of the present disclosure, the plurality of heating elements 4 are distributed in at least two conductive layers. Such arrangement enables the heating elements 4 to heat the display panel simultaneously in a multi-layer structure, which facilitates improving the heating uniformity and the heating rate. In addition, the plurality of heating elements 4 are distributed in at least two conductive layers, so that the influence on the aperture ratio of the display panel can be reduced to a certain extent, and the display quality can be improved while achieving heating.

In some embodiments of the present disclosure, the plurality of conductive layers include a first conductive layer group 001 and a second conductive layer group 002. The first conductive layer group 001 includes at least one conductive layer, and the first conductive layer group 001 is arranged on one a side of the liquid crystal layer 3 close to the first base substrate 1. The second conductive layer group 002 includes at least one conductive layer, and the second conductive layer group 002 is arranged on a side of the liquid crystal layer 3 away from the first base substrate 1. The heating elements 4 are distributed in the first conductive layer group 001 and/or the second conductive layer group 002.

As shown in FIGS. 5 to 9, in some embodiments of the present disclosure, for the heating elements 4 distributed in different conductive layers, a heating element 4 in at least one of the conductive layers is connected in parallel to a heating element 4 in another one of the conductive layers. The number of the conductive layers may be two, three, four, five, six or even more, and the heating elements 4 may be distributed in two conductive layers, three conductive layers, four conductive layers, five conductive layers, six conductive layers or even more conductive layers. Among these heating elements 4, heating elements 4 in at least two of the conductive layers are connected in parallel.

Figure 5:
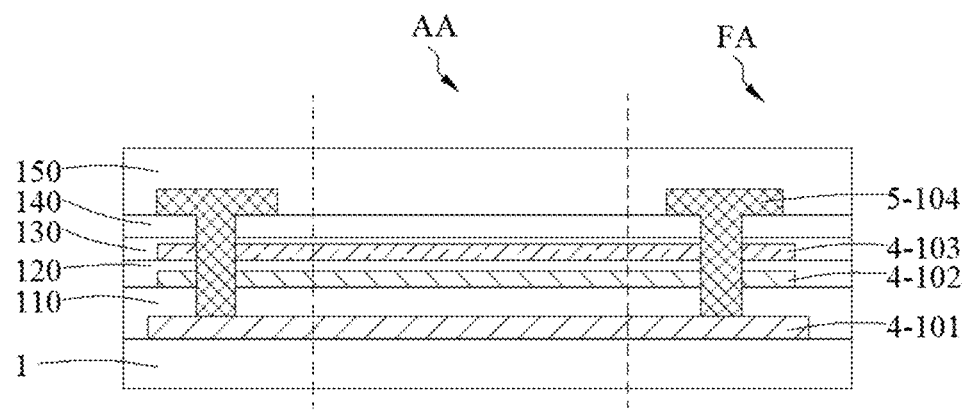
FIG. 5 is a schematic structural diagram of parallel heating elements in different conductive layers according to an exemplary embodiment of the present disclosure.
Figure 6:
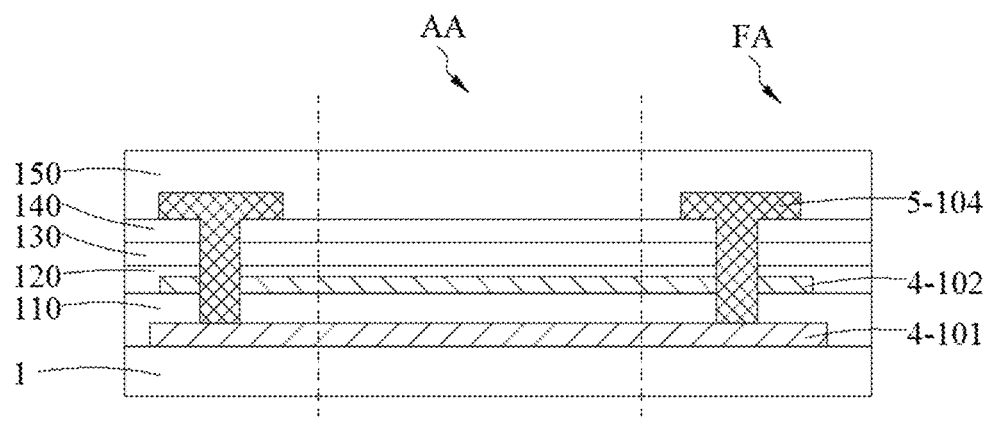
FIG. 6 is a schematic structural diagram of parallel heating elements in different conductive layers according to another exemplary embodiment of the present disclosure.

For example, as shown in FIGS. 1 to 4, the plurality of conductive layers include a first conductive layer 101, a second conductive layer 102, a third conductive layer 103, and the like, and the heating elements 4 are distributed in respective conductive layers. In some embodiments, the heating element 4 distributed in the first conductive layer 101 is connected in parallel to the heating element 4 distributed in the second conductive layer 102, as shown in FIG. 6. Alternatively, as shown in FIG. 5, the heating element 4 distributed in the first conductive layer 101, the heating element 4 distributed in the second conductive layer 102 and the heating element 4 distributed in the third conductive layer 103 are connected in parallel. It should be noted that exemplary examples here are merely illustrative to describe parallel connection of the heating elements 4, and do not limit the present disclosure.

The display panel includes an active area AA and a peripheral area FA located at the periphery of the active area AA. The active area AA is configured to display an image, and the peripheral area FA may be provided with a periphery circuit. The heating elements 4 in different conductive layers may be connected through a via hole. The via hole may be located in the peripheral area FA to reduce the influence on the aperture ratio of the display panel.

In the related art, the space provided by the display panel to arrange the heating element 4 is quite small, which may cause quite small heating element 4 in many cases, for example, a quite narrow line width. As a result, the resistance of the heating element is too large, which adversely affect the heating effect. In embodiments of the present disclosure, the heating elements 4 are connected in parallel, which facilitates reducing the resistance of the heating element 4 and increasing the current of the heating element 4, thereby improving the heating efficiency of the heating element 4. It should be noted that, when the heating elements 4 are distributed in more than two conductive layers, all heating elements 4 located in different conductive layers can be connected in parallel, and the specific number of heating elements connected in parallel may be set according to an actual resistance of the heating element 4, heating requirements of the display panel and the like.

As shown in FIGS. 5 to 9 and FIG. 26, in some embodiments of the present disclosure, the display panel further includes a coupling lead 5 and a heating control unit 6. The coupling lead 5 is distributed in at least one of the plurality of conductive layers, and the coupling lead 5 is located in the peripheral area FA. The heating control unit 6 may be located in the peripheral area FA, or may be provided in an externally-mounted manner. The heating control unit 6 is configured to control turned-on or turned-off of the heating element 4. The coupling lead 5 connects the heating element 4 and the heating control unit 6. The heating control unit 6 controls heating of the display panel by controlling turned-on or turned-off of the heating element 4. In addition, the coupling lead 5 may be distributed in the same conductive layer as the heating element 4, and when the coupling lead 5 and the heating element 4 are distributed in the same conductive layer, the two may be formed through the same photolithographic process.

In some embodiments of the present disclosure, orthographic projections of the heating elements 4 distributed in different conductive layers on the first base substrate 1 at least partially overlap, and an overlapping ratio is not less than 90%. In some embodiments, the orthographic projections of the heating elements 4 distributed in different conductive layers on the first base substrate 1 substantially overlap completely. That is, shapes and arrangements of the heating elements 4 in different conductive layers are substantially the same, so as to facilitate connection of the heating elements 4 in different conductive layers, and to reduce the influence on the aperture ratio of the display panel at the same time. It should be noted that, the overlapping ratio herein refers to a percentage of an overlapping area of the orthographic projections of the heating elements 4 in different conductive layers on the first base substrate 1 to an area of an orthographic projection of the heating element 4 in a single layer on the first base substrate 1.

As shown in FIGS. 1 to 4, in some embodiments of the present disclosure, the plurality of conductive layers include a first conductive layer 101, a second conductive layer 102, a third conductive layer 103, a fourth conductive layer 104, a fifth conductive layer 105 and a sixth conductive layer 106 arranged in sequence in a direction away from the first base substrate 1. The first conductive layer 101 includes a shielding structure. The second conductive layer 102 includes an active region of a transistor. The third conductive layer 103 includes a gate of the transistor. The fourth conductive layer 104 includes a source and a drain of the transistor. The fifth conductive layer 105 includes a first electrode 051. The sixth conductive layer 106 includes a second electrode 061. The second electrode 061 and the first electrode 051 are configured to form an electric field for driving the liquid crystal layer 3. The first electrode 051 may be a pixel electrode or a common electrode, and the second electrode 061 may be a common electrode or a pixel electrode correspondingly. In some embodiments, the first conductive layer 101, the second conductive layer 102, the third conductive layer 103, the fourth conductive layer 104, the fifth conductive layer 105 and the sixth conductive layer 106 may form the first conductive layer group 001.

The display panel may further include a first gate insulating layer 120, a second gate insulating layer 130, an interlayer dielectric layer 140, a planarization layer 150 and a passivation layer 160. The first gate insulating layer 120 is arranged between the second conductive layer 102 and the third conductive layer 103. The second gate insulating layer 130 and the interlayer dielectric layer 140 are arranged between the third conductive layer 103 and the fourth conductive layer 104. The planarization layer 150 is arranged between the fourth conductive layer 104 and the fifth conductive layer 105. The passivation layer 160 is arranged between the fifth conductive layer 105 and the sixth conductive layer 106.

The heating elements 4 are distributed in at least one conductive layer of six conductive layers composed of the first conductive layer 101, the second conductive layer 102, the third conductive layer 103, the fourth conductive layer 104, the fifth conductive layer 105 and the sixth conductive layer 106. That is, the heating elements 4 may be distributed in one conductive layer, two conductive layers, three conductive layers or even more conductive layers of the six conductive layers.

In some embodiments, the heating elements 4 are distributed in at least two conductive layers of the six conductive layers composed of the first conductive layer 101, the second conductive layer 102, the third conductive layer 103, the fourth conductive layer 104, the fifth conductive layer 105 and the sixth conductive layer 106, and a heating element 4 in at least one of the conductive layers is connected in parallel to a heating element 4 in another one of the conductive layers. According to embodiments, the heating element 4 may be formed with the same material and through the same photolithographic process as the first conductive layer 101, the second conductive layer 102, the third conductive layer 103, the fourth conductive layer 104, the fifth conductive layer 105 or the sixth conductive layer 106, thereby avoiding additional process steps and saving the cost.

For example, when the heating element 4 is distributed in the first conductive layer 101, and when a material of the first conductive layer 101 is metal or alloy materials, the metal or alloy materials may be deposited on a side of the first base substrate 1 first to form a conductive material layer, then the conductive material layer is patterned, and the heating element 4 and the shielding structure are obtained. For another example, when the heating element 4 is distributed in the second conductive layer 102, and when a material of the second conductive layer 102 is conductive materials such as polycrystalline silicon, IGZO (Indium Gallium Zinc Oxide) or the like, the conductive materials such as polycrystalline silicon, IGZO (Indium Gallium Zinc Oxide) or the like may be deposited on a side of the second conductive layer 102 first to form a conductive material layer, then the conductive material layer is patterned, and structures such as the heating element 4, the active region of the transistor are obtained. In addition, when the heating element 4 is distributed in other conductive layers, similar operations can be referred to above examples, which will not be repeated herein.

As shown in FIGS. 5 to 9, in some embodiments of the present disclosure, the heating elements 4 are distributed in at least two conductive layers of the six conductive layers composed of the first conductive layer 101, the second conductive layer 102, the third conductive layer 103, the fourth conductive layer 104, the fifth conductive layer 105 and the sixth conductive layer 106, and a heating element 4 in at least one of the conductive layers is connected in parallel to a heating element 4 in another one of the conductive layers. According to embodiments, heating elements 4 in different conductive layers may be connected through via holes, and then be connected to the heating control unit 6 through coupling leads 5. The via holes for connection may be located in the peripheral area FA, so as to reduce the influence on the aperture ratio of the display panel.

For example, as shown in FIG. 6, when the heating elements 4 are distributed in the first conductive layer 101 and the second conductive layer 102, and when the coupling lead 5 is located in the fourth conductive layer 104, a via hole may be formed in the structures such as the first conductive layer 101, and the second conductive layer 102 before the fourth conductive layer 104 is formed, and the via hole is located in the peripheral area FA. Then the heating element 4 distributed in the first conductive layer 101 and the heating element 4 distributed in the second conductive layer 102 are connected through the coupling lead 5 distributed in the fourth conductive layer 104. For another example, as shown in FIG. 5, when the heating elements 4 are distributed in the first conductive layer 101, the second conductive layer 102 and the third conductive layer 103, and when the coupling lead 5 is distributed in the fourth conductive layer 104, a via hole may be formed in the structures such as the first conductive layer 101, the second conductive layer 102, and the third conductive layer 103 before the fourth conductive layer 104 is formed, and the via hole is located in the peripheral area FA. Then the heating element 4 distributed in the first conductive layer 101, the heating element 4 distributed in the second conductive layer 102 and the heating element 4 distributed in the third conductive layer 103 are connected through the coupling lead 5 distributed in the fourth conductive layer 104, so as to be connected to the heating control unit 6 in the peripheral area FA.

Figure 7:
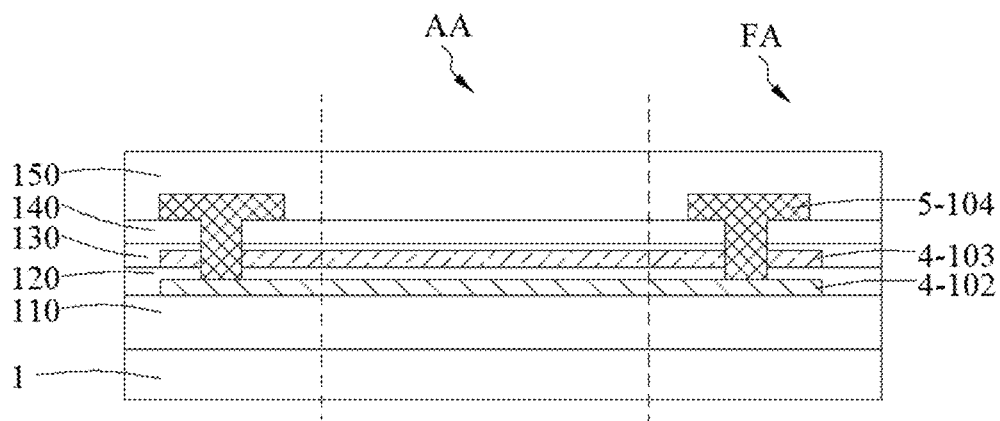
FIG. 7 is a schematic structural diagram of parallel heating elements in different conductive layers according to another exemplary embodiment of the present disclosure.

For another example, as shown in FIG. 7, when the heating elements 4 are distributed in the second conductive layer 102 and the third conductive layer 103, and when the coupling lead 5 is distributed in the fourth conductive layer 104, a via hole may be formed in the structures such as the second conductive layer 102, and the third conductive layer 103 before the fourth conductive layer 104 is formed, and the via hole is located in the peripheral area FA. Then the heating element 4 distributed in the second conductive layer 102 and the heating element distributed in the third conductive layer 103 are connected through the coupling lead 5 distributed in the fourth conductive layer 104.

Figure 8:
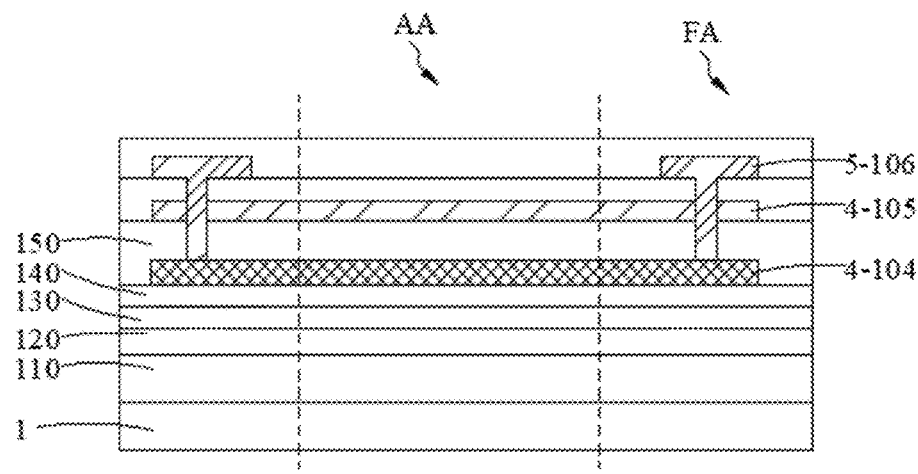
FIG. 8 is a schematic structural diagram of parallel heating elements in different conductive layers according to another exemplary embodiment of the present disclosure.

For another example, as shown in FIG. 8, when the heating elements 4 are located in the fourth conductive layer 104 and the fifth conductive layer 105, and when the coupling lead 5 is distributed in the sixth conductive layer 106, a via hole may be formed in the structures such as the fourth conductive layer 104, and the fifth conductive layer 105 before the sixth conductive layer 106 is formed, and the via hole is located in the peripheral area FA. Then the heating element 4 distributed in the fourth conductive layer 104 and the heating element distributed in the fifth conductive layer 105 are connected through the coupling lead 5 distributed in the sixth conductive layer 106.

Figure 2:
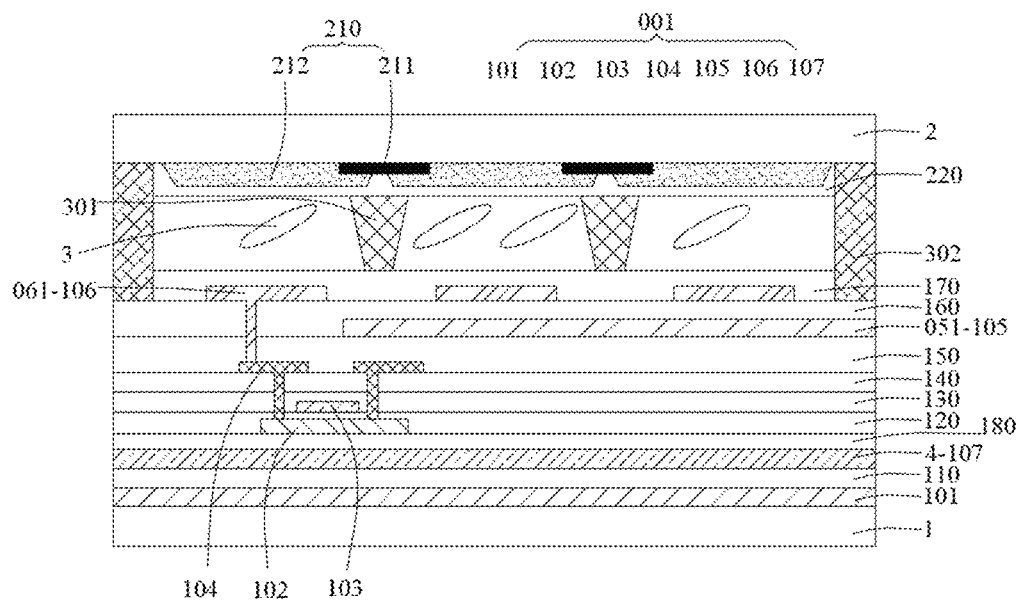
FIG. 2 is a schematic structural diagram of a display panel including a seventh conductive layer according to an exemplary embodiment of the present disclosure.
Figure 3:
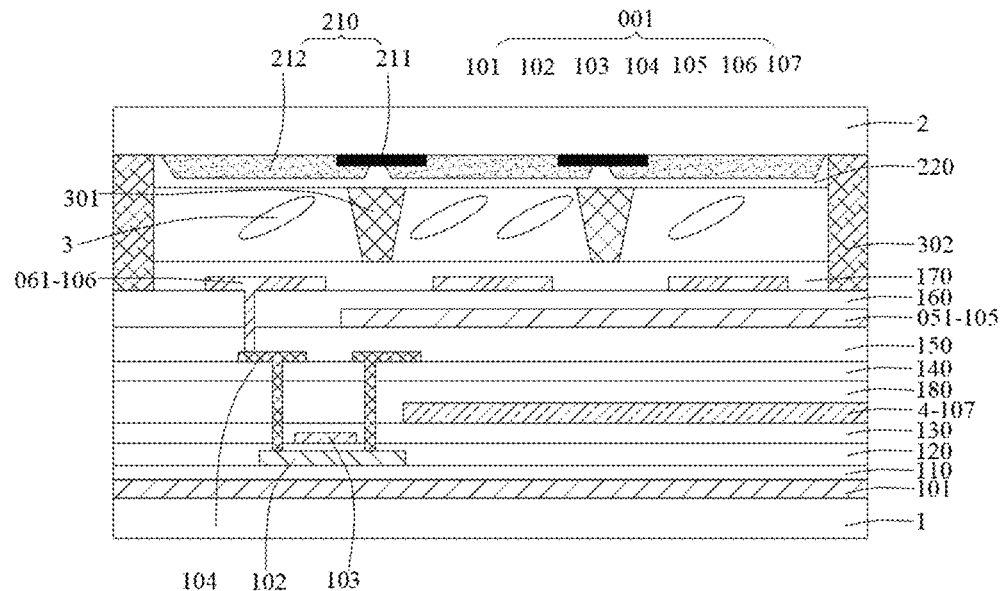
FIG. 3 is a schematic structural diagram of a display panel including a seventh conductive layer according to another exemplary embodiment of the present disclosure.
Figure 4:
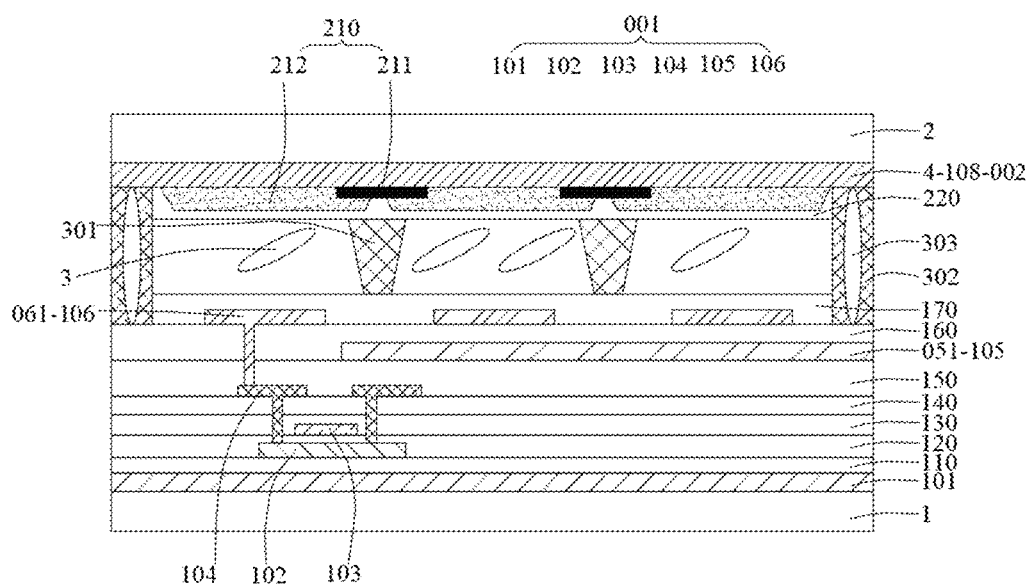
FIG. 4 is a schematic structural diagram of a display panel including an eighth conductive layer according to an exemplary embodiment of the present disclosure.

As shown in FIGS. 2 to 4, in some embodiments of the present disclosure, the heating element 4 may be formed in the display panel through an additional photolithographic process. For example, as shown in FIGS. 2 to 3, the plurality of conductive layers further include a seventh conductive layer 107, and the conductive layer 107 is arranged between any two conductive layers of the six conductive layers composed of the first conductive layer 101, the second conductive layer 102, the third conductive layer 103, the fourth conductive layer 104, the fifth conductive layer 105 and the sixth conductive layer 106, or the conductive layer 107 is arranged on a side of the first conductive layer 101 close to the first base substrate 1. As shown in FIG. 2, the seventh conductive layer 107 is arranged between the first conductive layer 101 and the second conductive layer 102. As shown in FIG. 3, the seventh conductive layer 107 is arranged between the third conductive layer 103 and the fourth conductive layer 104. Herein, the first conductive layer 101, the second conductive layer 102, the third conductive layer 103, the fourth conductive layer 104, the fifth conductive layer 105, the sixth conductive layer 106 and the seventh conductive layer 107 may form the first conductive layer group 001.

Figure 9:
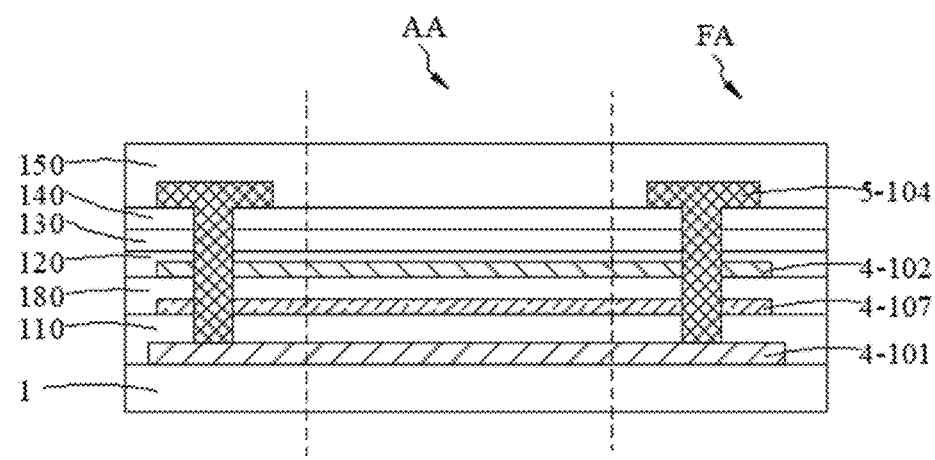
FIG. 9 is a schematic structural diagram of parallel heating elements in different conductive layers according to another exemplary embodiment of the present disclosure.

It should be noted that, when the seventh conductive layer 107 is further included in the display panel, an insulating layer 180 is provided between the seventh conductive layer 107 and its adjacent conductive layer. In some embodiments, at least part of the heating elements 4 are distributed in the seventh conductive layer 107. It should be noted that, in some embodiments, the heating elements 4 may also be distributed in any conductive layer of above six conductive layers composed of the first conductive layer to the sixth conductive layer in addition to the seventh conductive layer, and the heating element 4 in the seventh conductive layer 107 is connected in parallel to the heating element 4 in at least one conductive layer of the six conductive layers composed of the first conductive layer 101, the second conductive layer 102, the third conductive layer 103, the fourth conductive layer 104, the fifth conductive layer 105 and the sixth conductive layer 106. As shown in FIG. 9, the heating element 4 distributed in the first conductive layer 101, the heating element 4 distributed in the seventh conductive layer 107 and the heating element 4 distributed in the second conductive layer 102 are connected in parallel.

As shown in FIGS. 13 to 18, in some embodiments of the present disclosure, the heating element 4 is a heating wire, and can be located in a plurality of areas of the display panel in a variety of ways.

Figure 13:
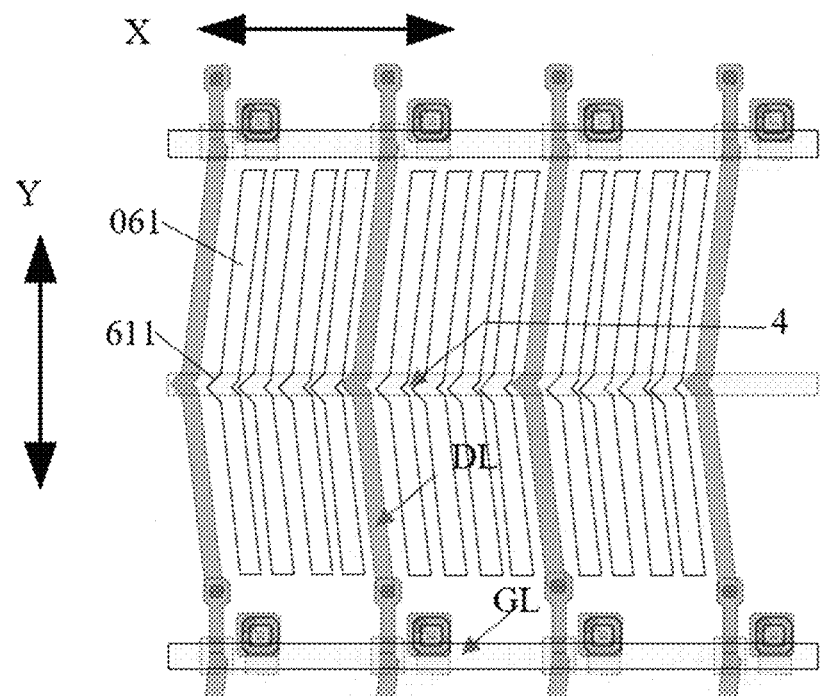
FIG. 13 is a schematic structural diagram of distribution of positions of heating elements according to an exemplary embodiment of the present disclosure.
Figure 14:
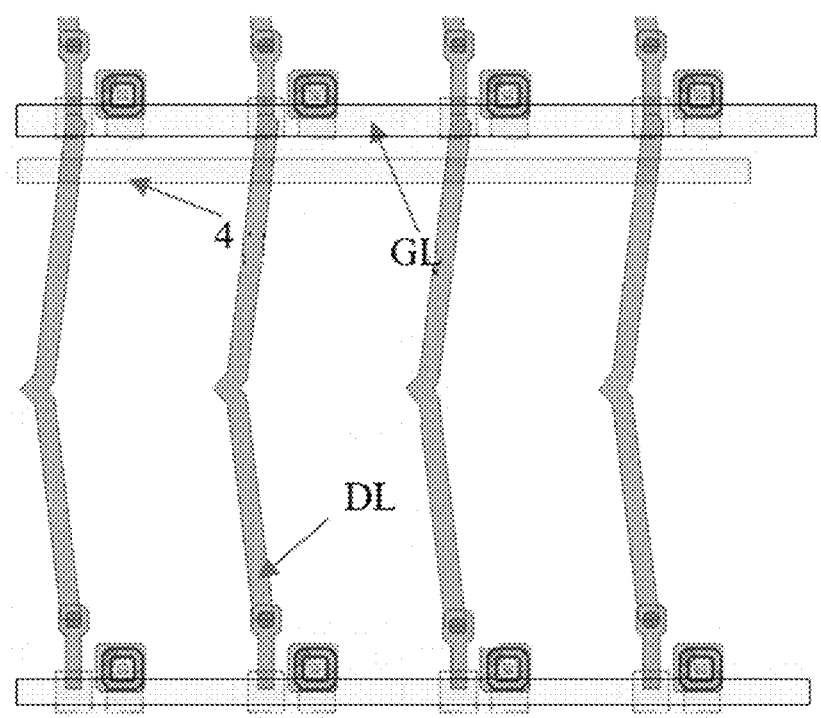
FIG. 14 is a schematic structural diagram of distribution of positions of heating elements according to another exemplary embodiment of the present disclosure.
Figure 15:
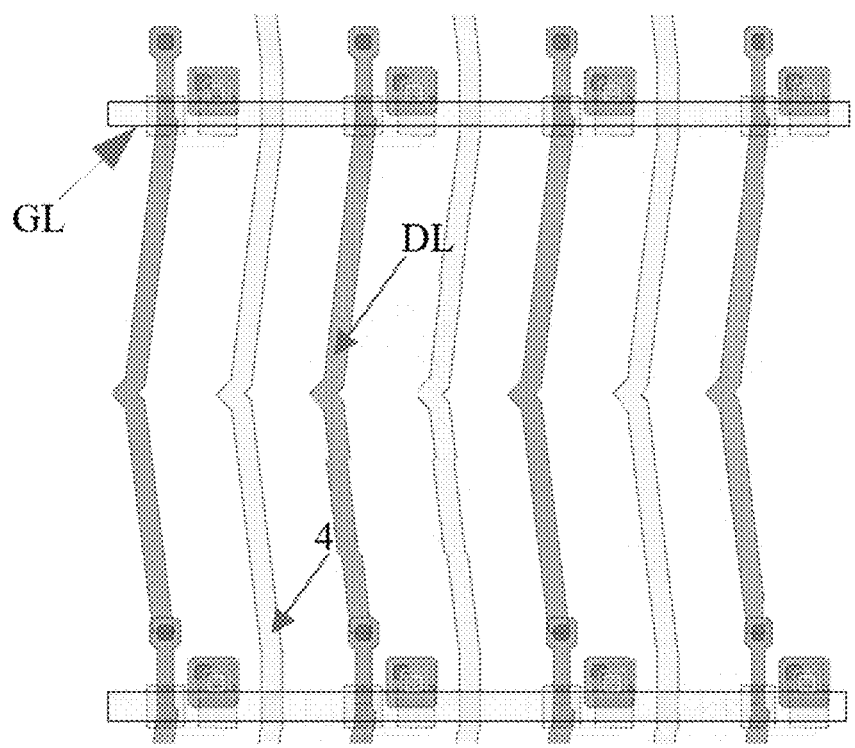
FIG. 15 is a schematic structural diagram of distribution of positions of heating elements according to another exemplary embodiment of the present disclosure.
Figure 16:
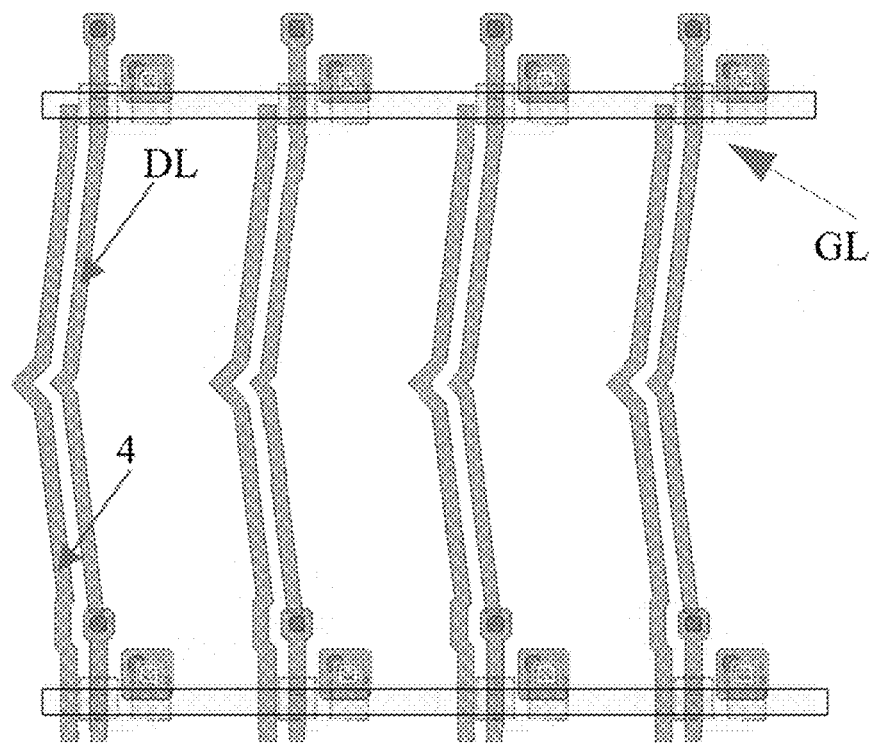
FIG. 16 is a schematic structural diagram of distribution of positions of heating elements according to another exemplary embodiment of the present disclosure.
Figure 17:
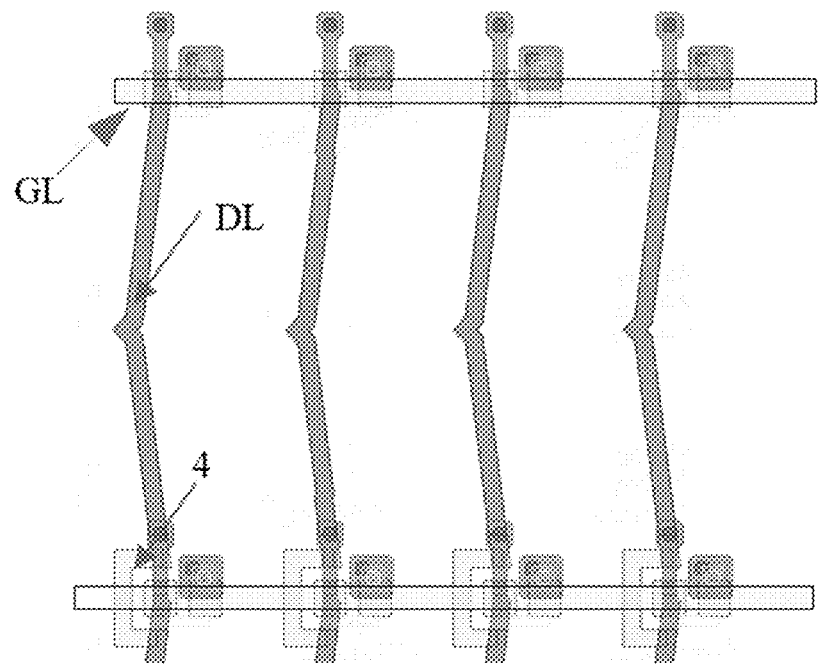
FIG. 17 is a schematic structural diagram of distribution of positions of heating elements according to another exemplary embodiment of the present disclosure.
Figure 18:
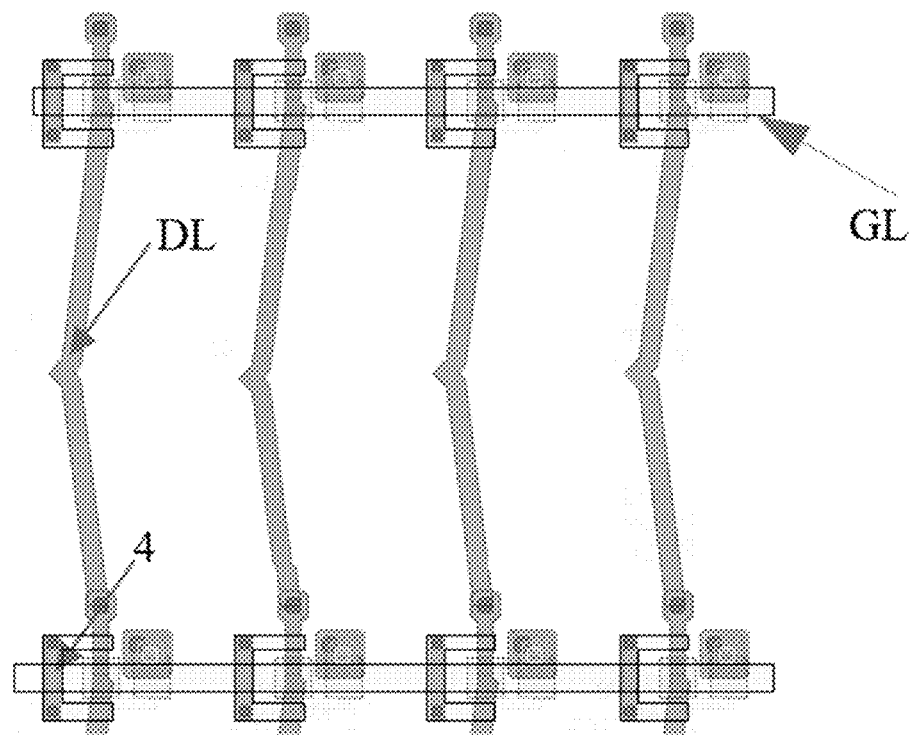
FIG. 18 is a schematic structural diagram of distribution of positions of heating elements according to another exemplary embodiment of the present disclosure.

The display panel includes a plurality of data lines DL and a plurality of scan lines GL, and the scan lines GL and the data lines DL intersect with each other to define a plurality of pixel areas. As shown in FIGS. 13 and 14, the plurality of heating elements 4 extend in an extension direction along which the scan lines GL extend, and are arranged in an arrangement direction along which the scan lines GL are arranged. As shown in FIGS. 16, 17 and 18, the plurality of heating elements 4 extend in an extension direction along which the data lines DL extend, and are arranged in an arrangement direction along which the data lines DL are arranged. The heating element 4 can be a heating wire, and a line width of the heating wire can range from 5 µm to 10 µm, for example, 5 µm, 6 µm, 7 µm, 8 µm, 9 µm, 10 µm or the like, but is not limited thereto. In some embodiments, the plurality of scan lines GL extend along a first direction X, and are arranged along a second direction Y, and an included angle between the first direction X and the second direction Y is about 90°. The plurality of data lines DL extend along the second direction Y, and are arranged along the first direction X. Therefore, in some embodiments, the heating element 4 is substantially in parallel or overlaps with the scan line GL, that is, the heating element 4 extends in the first direction X, and is arranged in the second direction Y. In some other embodiments, the heating element 4 is substantially in parallel or overlaps with the data line DL, that is, the heating element 4 extends in the second direction Y, and is arranged in the first direction X.

As shown in FIG. 14, in some embodiments of the present disclosure, when the heating element 4 extends in the extension direction of the scan line GL, an orthographic projection of the heating element 4 on the first base substrate 1 at least partially overlaps with an orthographic projection of the scan line GL on the first base substrate 1, or the spacing between the orthographic projection of the heating element 4 on the first base substrate 1 and the orthographic projection of the scan line GL on the first base substrate 1 is not greater than 20 µm. As shown in FIGS. 16 to 18, when the heating element 4 extends in the extension direction of the data line DL, an orthographic projection of the heating element 4 on the first base substrate 1 at least partially overlaps with an orthographic projection of the data line DL on the first base substrate 1, or the spacing between the orthographic projection of the heating element 4 on the first base substrate 1 and the orthographic projection of the data line DL on the first base substrate 1 is not greater than 20 µm. According to embodiments, the heating element 4 overlaps with the scan line GL or the data line DL, or is located close to the scan line GL or the data line DL, which can reduce the influence on the aperture ratio, and ensure the display quality.

As shown in FIG. 13, in some other embodiments of the present disclosure, the first electrode 051 or the second electrode 061 has a plurality of slits. The slit has a bending portion 611, and each slit is parallel to each other. The extension direction of the heating element 4 is parallel to an arrangement direction of each slit, and the orthographic projection of the heating element 4 on the first base substrate 1 at least partially overlaps with an orthographic projection of the bending portion 611 on the first base substrate 1. Further, an edge of the data line DL is parallel to an edge of the slit. The slits are arranged along the extension direction of the scan line GL, and the heating element 4 extends along the extension direction of the scan line GL.

The display panel will be further explained by taking the first electrode 051 is the pixel electrode and the second electrode 061 is the common electrode as an example. In some embodiments, a pixel unit of the display panel is divided into two parts from the bending portion 611 of the slit, and liquid crystal molecules of the two parts deflect in opposite directions under driving of a voltage, which may self-compensate for the "chromatic aberration" at different viewing angles caused by the anisotropy refractive index of the liquid crystal molecules, and further improve the display quality of the display panel. In addition, in some embodiments, an area where the bent portion 611 is located is a dark display area, and the heating element 4 is arranged in the dark display area, which may reduce the influence on the display quality.

In some embodiments of the present disclosure, the heating element 4 may extend in the extension direction of the scan line GL, or extend in the extension direction of the data line DL. When the heating element 4 extends in the extension direction of the data line DL, the heating element 4 may be distributed in the same conductive layer as the scan line GL, or may not be distributed in the same conductive layer. For example, as shown in FIGS. 16 and 17, when the scan line GL is distributed in the third conductive layer 103, the heating element 4 is not distributed in the third conductive layer 103, but is distributed together with the data line DL in the fourth conductive layer 104, or is distributed together with the active region of the transistor in the second conductive layer 102. As a result, the short connection between the heating element 4 and the scan line GL can be avoided. In some embodiments, as shown in FIG. 18, the heating element 4 may also be distributed in the same conductive layer with the scan line GL, at this time, the heating element 4 distributed in the same layer as the scan line GL needs to be disconnected when encountering the scan line GL, and then recoupled through other conductive layers, such as the fourth conductive layer 104 including the data line DL, so as to ensure conductive connection of the disconnected heating element 4.

Similarly, when the heating element 4 extends in the extension direction of the scan line GL, the heating element 4 may be distributed in the same conductive layer as the data line DL, or may not be distributed in the same conductive layer. For example, when the data line DL is distributed in the fourth conductive layer 104, the heating element 4 is not distributed in the fourth conductive layer 104, which can avoid the short connection between the heating element 4 and the data line DL. In some embodiments, the heating element 4 may also be distributed in the same conductive layer as the data line DL, at this time, the heating element 4 distributed in the same layer as the data line DL needs to be disconnected when encountering the data line DL, and then recoupled through other conductive layers, so as to ensure conductive connection of the disconnected heating element 4.

In some embodiments, the heating element 4 may also be located at other places of the display panel, in addition to being near the scan line GL or the data line DL and the dark area corresponding to the bending portion 611, especially, when the heating element 4 is made of transparent materials, such as ITO (Indium Tin Oxide). IZO (Indium Zinc Oxide), etc., it may be provided at any places of the display panel, and details are shown in FIG. 5.

In some embodiments of the present disclosure, the heating elements 4 may be arranged on a side of the liquid crystal layer 3 close to the first base substrate 1, or may be arranged on a side of the liquid crystal layer 3 away from the first base substrate 1. For example, the heating element 4 is arranged on a color film substrate.

Figure 20:
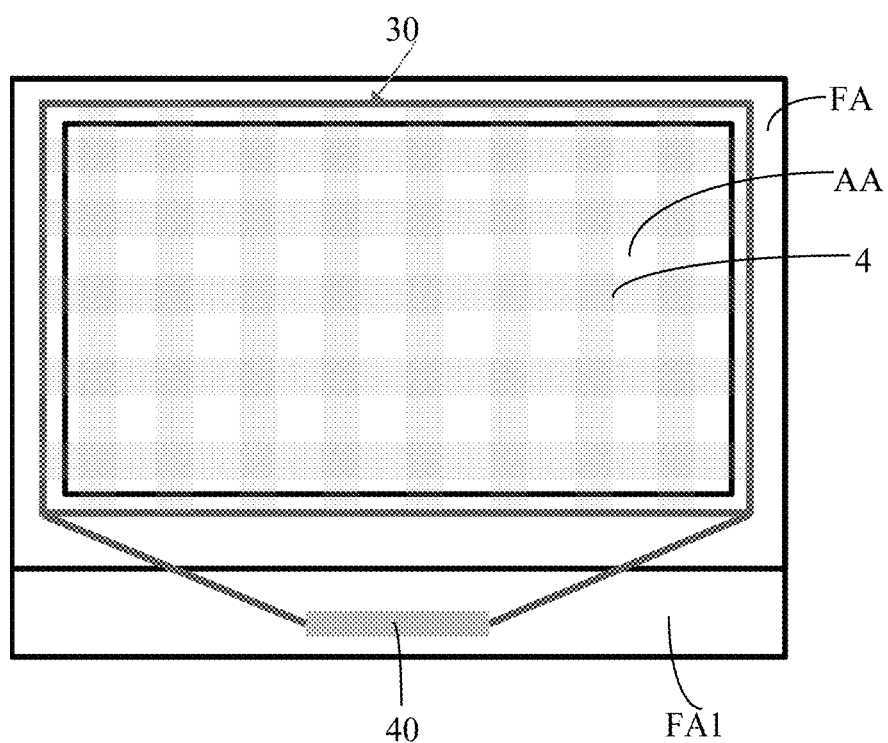
FIG. 20 is a schematic structural diagram of an eighth conductive layer according to an exemplary embodiment of the present disclosure.
Figure 26:
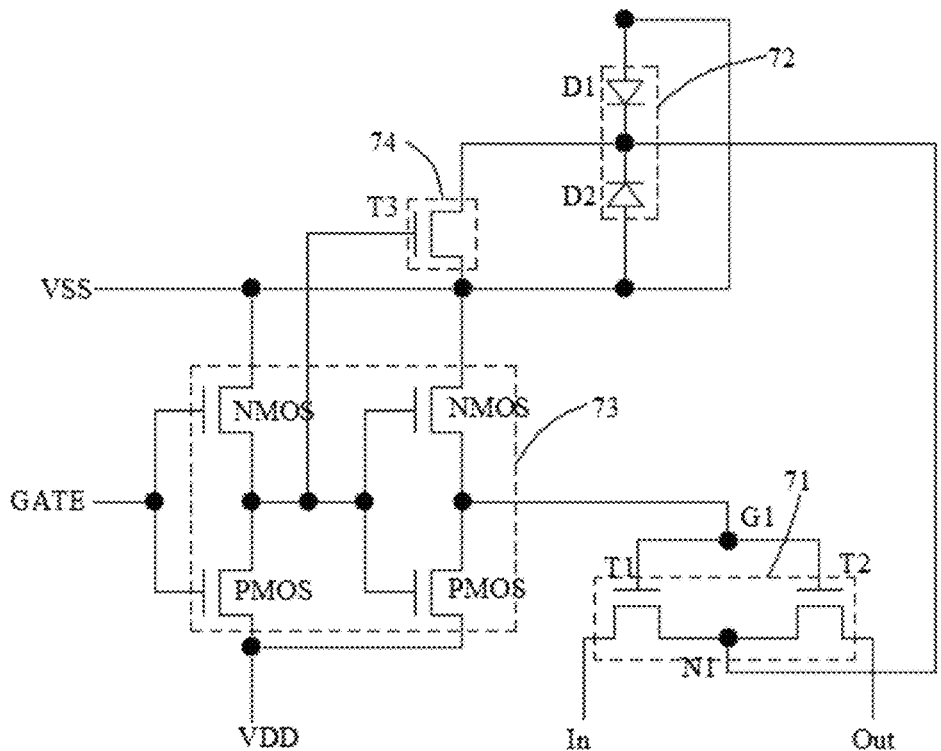
FIG. 26 is a schematic structural diagram of a temperature detection circuit according to an exemplary embodiment of the present disclosure.

As shown in FIG. 4, in some embodiments of the present disclosure, the plurality of conductive layers further include an eighth conductive layer 108. The eighth conductive layer 108 is arranged on a side of the liquid crystal layer 3 away from the first base substrate 1. At least part of the heating elements 4 are distributed in the eighth conductive layer 108. The heating element 4 distributed in the eighth conductive layer 108 may be connected to the heating control unit 6 individually so as to be controlled through the heating control unit 6 individually. As shown in FIGS. 20 and 26, the heating element 4 is connected to a pad 40 located in the binding area FA1 through a periphery connecting line 30, and then connected to the externally-mounted heating control unit 6. In some embodiments, the heating element 4 distributed in the eighth conductive layer 108 may also be connected in parallel to the heating element 4 distributed in other conductive layers through a conductive structure, and may be jointly controlled by the heating control unit 6. In some embodiments, the eighth conductive layer 108 may form the second conductive layer group 002 correspondingly.

As shown in FIG. 4, in some embodiments, the display panel further includes sealant 302 sealed between the first base substrate 1 and the second base substrate 2. A conductive element 303 is provided in the sealant 302, and the heating element 4 distributed in the eighth conductive layer 108 is connected to the heating control unit 6 through the conductive element 303. The heating control unit 6 may be arranged on a side of the first base substrate 1.

In some other embodiments, the heating element 4 distributed in the eighth conductive layer 108 is connected in parallel to the heating element 4 in at least one conductive layer of the six conductive layers composed of the first conductive layer 101, the second conductive layer 102, the third conductive layer 103, the fourth conductive layer 104, the fifth conductive layer 105, and the sixth conductive layer 106. In some embodiments, there are many kinds of parallel connection structures. For example, the heating element 4 distributed in the eighth conductive layer 108 may be connected to a certain conductive layer through the conductive element 303 in the sealant 302, and then further connected to the heating element 4 in the conductive layer, which will not be limited in detail in the present disclosure.

Figure 10:
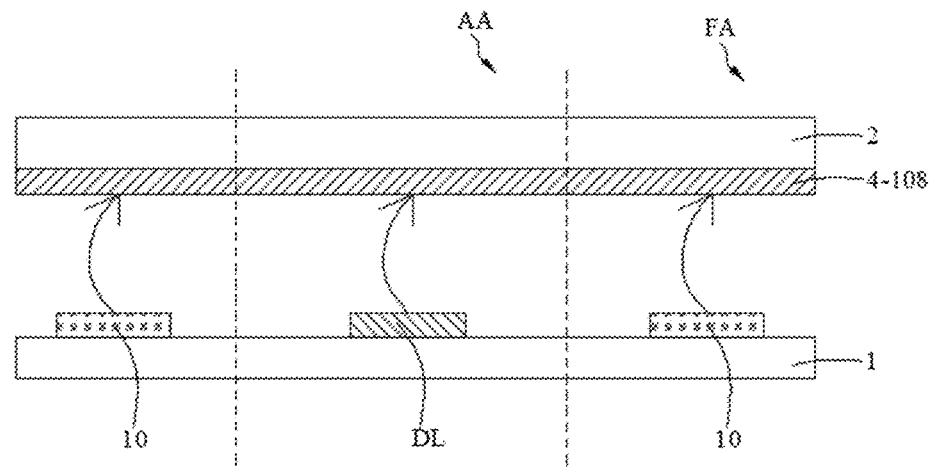
FIG. 10 is a schematic diagram of a structure of a display panel for shielding electromagnetic interference according to an exemplary embodiment of the present disclosure.
Figure 11:
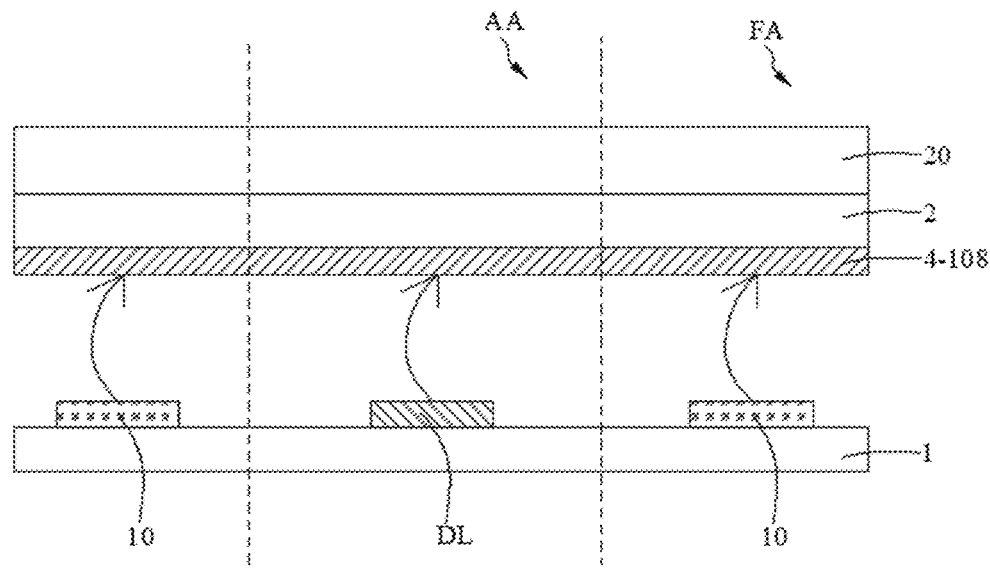
FIG. 11 is a schematic diagram of a structure of a display panel for shielding electromagnetic interference according to another exemplary embodiment of the present disclosure.

In some embodiments of the present disclosure, as shown in FIG. 10, the eighth conductive layer 108 is arranged on a side of the liquid crystal layer 3 close to the second base substrate 2. The eighth conductive layer 108 can be used to shield signals such as the data line DL in the active area AA, and the electromagnetic radiation of signals of the gate driver circuit in the peripheral area FA, thereby improving the EMC (Electro Magnetic Compatibility) performance of the display product, such as in-vehicle products. In addition, as shown in FIG. 11, the interference to the externally-mounted touch assembly 20 can also be reduced and the overall performance of the display product can be improved.

Figure 12:
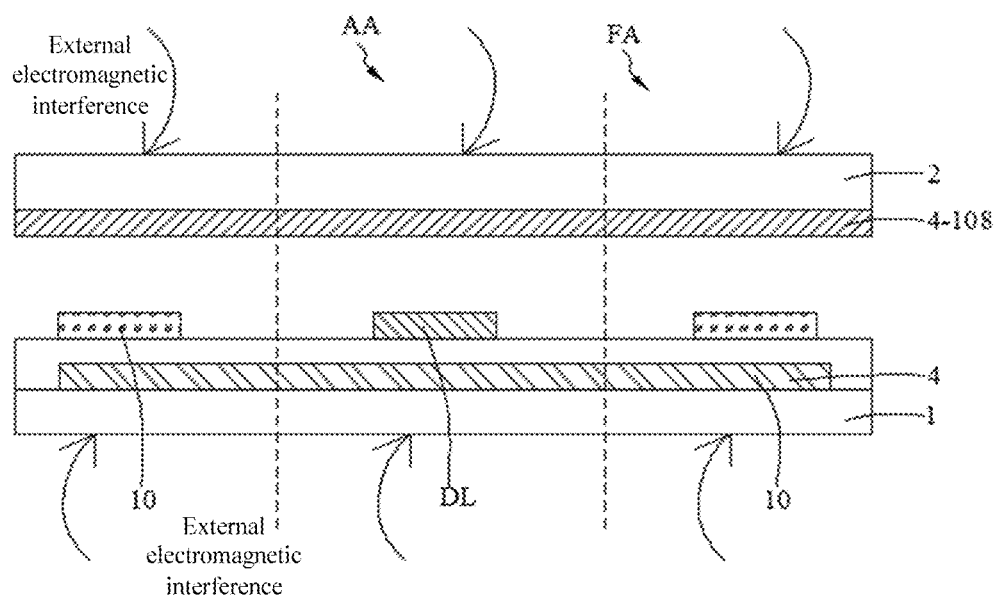
FIG. 12 is a schematic diagram of a structure of a display panel for shielding electromagnetic interference according to another exemplary embodiment of the present disclosure.

In some embodiments, as shown in FIG. 12, a conductive layer, such as the seventh conductive layer 107, is arranged on a side of the liquid crystal layer 3 close to the first base substrate 1, which may further protect signals of the data line DL, the gate driver circuit and the like inside the display panel from external electromagnetic radiation interference, and improve the stability of the display panel.

Figure 19:
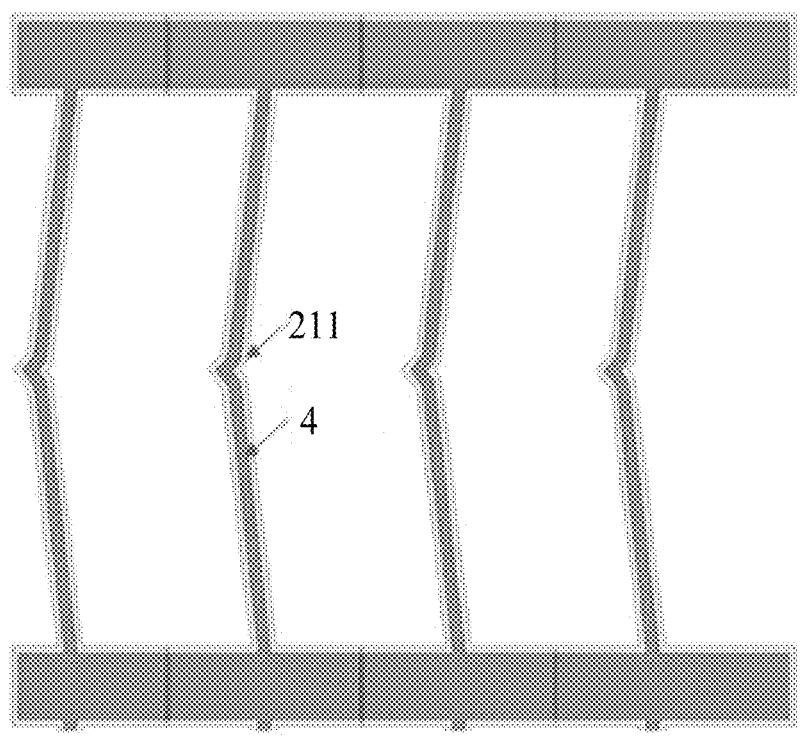
FIG. 19 is a schematic structural diagram of distribution of positions of heating elements according to another exemplary embodiment of the present disclosure.

As shown in FIGS. 4 and 19, in some embodiments of the present disclosure, the display panel further includes a color film layer 210. The color film layer 210 is arranged between the liquid crystal layer 3 and the second base substrate 2. In some embodiments, the display panel further includes a first alignment layer 170 and a second alignment layer 220. The first alignment layer 170 is arranged between the sixth conductive layer 106 and the liquid crystal layer 3. The second alignment layer 220 is arranged between the liquid crystal layer 3 and the color film layer 210. The color film layer 210 includes a shielding portion 211 and a plurality of filter portions 212 defined by the shielding portion 211. The filter portion 212 is provided in a one-to-one correspondence to the pixel area in a direction perpendicular to the first base substrate 1. A material of the shielding portion 211 is a shielding material, such as black resin materials. The light from the backlight can emit different colors of light after passing through the filter portion 212. The display panel further includes a spacer 301. The spacer 301 is arranged between the first base substrate 1 and the second base substrate 2, and an orthographic projection of the spacer 301 on the first base substrate 1 at least partially overlaps with an orthographic projection of the shielding portion 211 on the first base substrate 1.

An orthographic projection of the heating element 4 on the first base substrate 1 is located within an orthographic projection of the shielding portion 211 on the first base substrate 1. As shown in FIG. 19, in some embodiments, the heating element 4 distributed in the eighth conductive layer 108 may be of a grid structure, and an orthographic projection of the conductive layer of the grid structure on the first base substrate 1 is located within an orthographic projection of the shielding portion 211 on the first base substrate 1.

As shown in FIGS. 21 to 24, in embodiments of the present disclosure, the number of heating elements 4 is multiple. Among the plurality of heating elements 4 distributed in the same of the same conductive layer, at least part of the heating elements 4 are connected in parallel or in series to form a heating unit 004, and the specific connection mode can be selected according to actual heating requirements. For example, in some embodiments, among the plurality of heating elements 4 distributed in the same conductive layer, at least every two heating elements 4 are connected in series or in parallel, and specifically, every two heating elements 4, every three heating elements 4, every four heating elements 4, every five heating elements 4 or more heating elements 4 may be connected in series or in parallel to form the heating unit 004.

In some embodiments, the display panel has a central axis 0, and an extending direction of the central axis 0 is perpendicular to the extending direction of the heating element 4. The heating element 4 has a first end and a second end. The first ends of all of the heating elements 4 are located on one side of the central axis 0, and the second ends of all of the heating elements 4 are located on the other side of the central axis 0. Among the plurality of heating elements 4 distributed in the same conductive layer, the first ends or/and the second ends of at least two heating elements 4 are connected with each other. In some embodiments, the first end and the second end of the heating element 4 may be located in the peripheral area FA, so that the heating element 4 formed spreads throughout the active area AA of the display panel, which can be used to heat the areas of the active area AA.

In some embodiments of the present disclosure, the coupling lead 5 connects the heating unit 004 and the heating control unit 6. The coupling leads 5 are distributed in at least two conductive layers of the plurality conductive layers, and the coupling leads 5 distributed in different conductive layers are connected in parallel. According to embodiments, the coupling leads 5 located in different conductive layers are connected in parallel, which facilitates to increase the current that can be carried in the coupling leads 5 to a certain extent, and ensures the safety and stability of the display panel.

Figure 21:
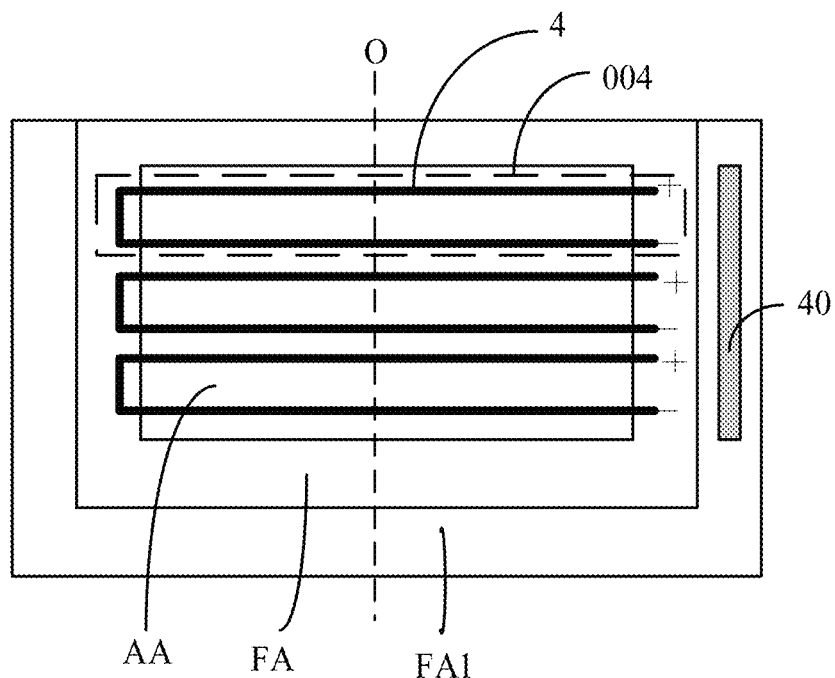
FIG. 21 is a schematic structural diagram of connection of heating elements in the same conductive layer according to an exemplary embodiment of the present disclosure.

In some embodiments of the present disclosure, the plurality of heating elements 4 distributed in the same conductive layer can be connected in a variety of ways. As shown in FIG. 21, in some other embodiments, among the plurality of heating elements 4 distributed in the same conductive layer, the first ends of every two heating elements 4 are connected, and the second ends thereof are not connected, forming a plurality of substantially U-shaped components. The U-shaped component is the heating unit 004. One end of the U-shaped component may act as an input terminal, and whether a supply voltage is to be inputted is controlled by the heating control unit 6. When the supply voltage is input, the other end of the U-shaped component acts as an output terminal, and the current is input through the input terminal, flows through the U-shaped component, and then is output through the output terminal, thus completing the heating of the display panel. It should be noted that, different U-shaped components may be correspondingly connected to different heating control units 6 to realize independent control of each U-shaped component. In some embodiments, each U-shaped component may be connected to the heating control unit 6 through the pad 40.

Figure 22:
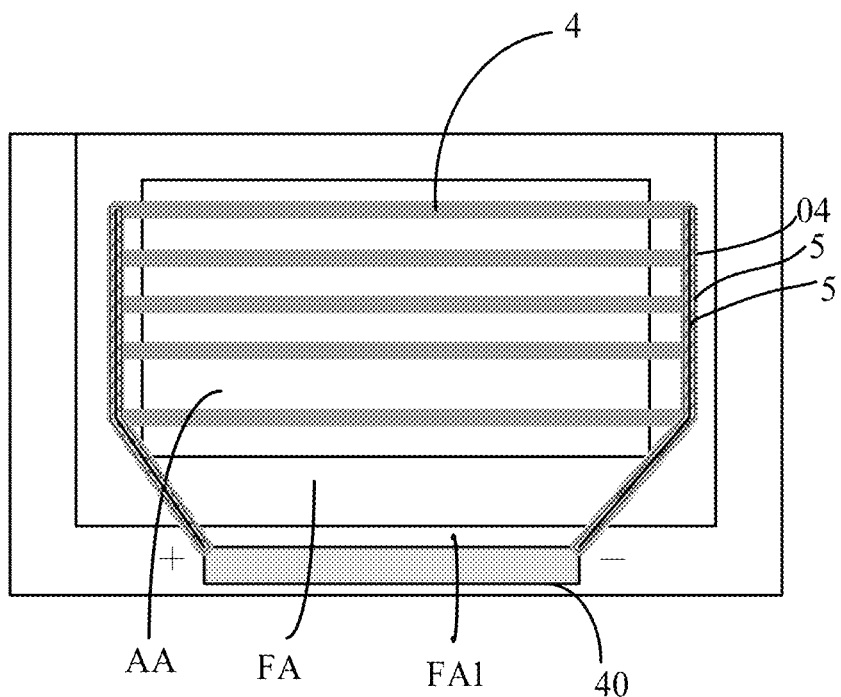
FIG. 22 is a schematic structural diagram of connection of heating elements connection in the same conductive layer according to another exemplary embodiment of the present disclosure.
Figure 23:
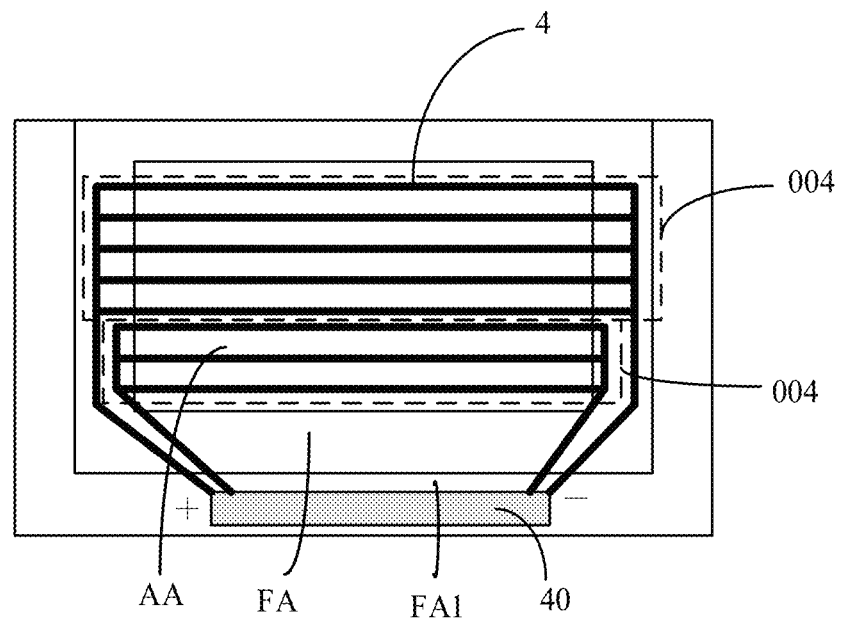
FIG. 23 is a schematic structural diagram of connection of heating elements in the same conductive layer according to another exemplary embodiment of the present disclosure.

As shown in FIG. 23, in some other embodiments, among the plurality of heating elements 4 distributed in the same conductive layer, the first ends of at least every two heating elements 4 are connected to each other, and the second ends thereof are connected to each other. In some embodiments, the heating elements 4 distributed in the same conductive layer may be connected in parallel to each other. For example, among the plurality of heating elements 4 distributed in the same conductive layer, the first ends of every two, three, four, five or more heating elements 4 are connected to each other, and the second ends thereof are also connected to each other. The heating elements 4 are connected in parallel to form a grid component. The grid component is the heating unit 004. In some embodiments, the grid component is connected to the heating control unit 6, and the heating control unit 6 controls turned-on or turned-off of the grid component. Different grid components may be connected to different heating control units 6 correspondingly to realize independent control of each grid component. In some embodiments, the plurality of heating elements 4 in the same conductive layer may also be all connected in parallel as a whole, as shown in FIG. 22, and the number of parallel connection is not limited in the present disclosure.

Figure 25:
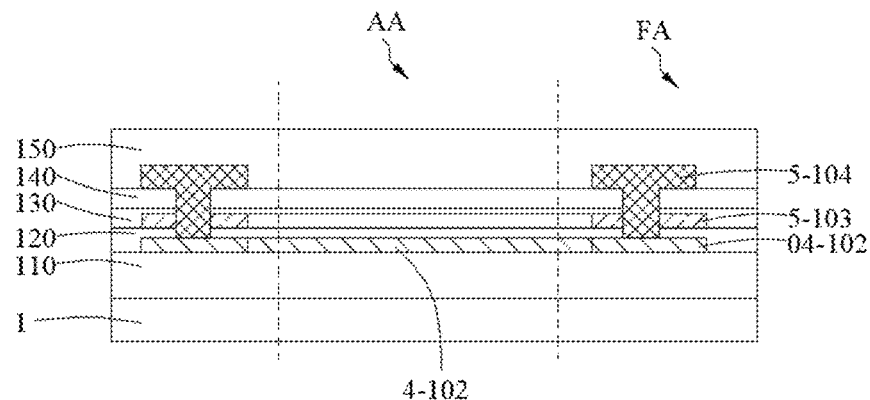
FIG. 25 is a schematic structural diagram of connection of a coupling lead in different conductive layers according to an exemplary embodiment of the present disclosure.

As shown in FIGS. 22, 23 and 25, in some embodiments of the present disclosure, the first ends and the second ends of the plurality of heating elements 4 distributed in the same conductive layer may be connected through a connecting line 04. The connecting line 04 is distributed in the same conductive layer as the heating elements 4. As shown in FIG. 25, both the heating element 4 and the connecting line 04 are distributed in the second conductive layer 102. The connecting line 04 may be reused as the coupling lead 5 and connected in parallel to the coupling lead 5 distributed in other conductive layers. For example, the connecting line 04 is connected in parallel to the coupling lead 5 distributed in the third conductive layer 103 and the coupling lead 5 distributed in the fourth conductive layer 104, and the three jointly connect the heating unit 004 with the pad 40, and then to the heating control unit 6.

Figure 24:
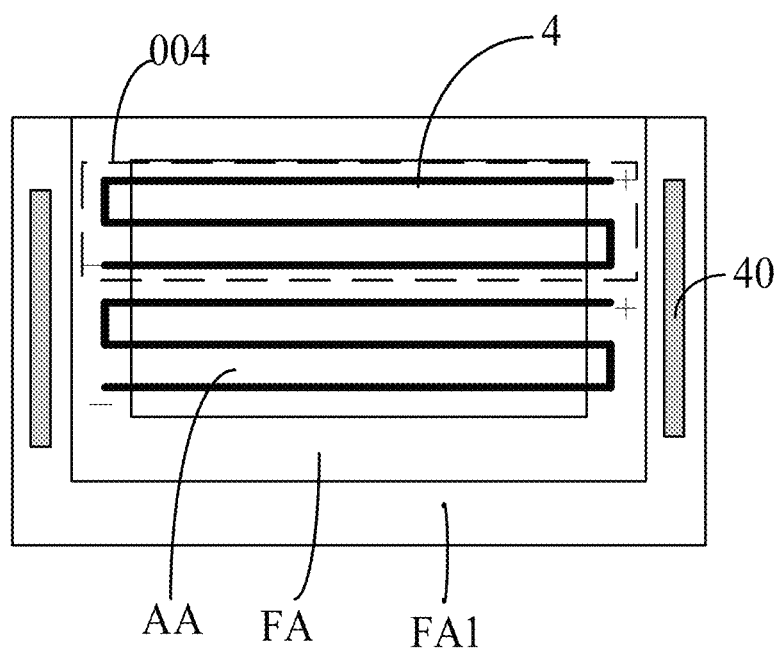
FIG. 24 is a schematic structural diagram of connection of heating elements in the same conductive layer according to another exemplary embodiment of the present disclosure.

As shown in FIG. 24, in some other embodiments, among the plurality of heating elements 4 distributed in the same conductive layer, every three heating elements 4 are connected in series to form an S-shaped component. The S-shaped component is the heating unit 004. In some embodiments, the S-shaped component is connected to the heating control unit 6, and the heating control unit 6 controls turned-on and turned-off of the S-shaped component. Different S-shaped components may be connected to different heating control units 6 correspondingly to realize independent control of each S-shaped component. In some embodiments, every three, four, five or more heating elements 4 in the same conductive layer may be connected in series to form a serpentine component, and which will not be limited in detail in the present disclosure. In some embodiments, the S-shaped component may also be connected to the heating control unit 6 through the coupling leads 5 distributed in different conductive layers, specific connection ways can be referred to the foregoing embodiments, which will not be elaborated here.

Figure 27:
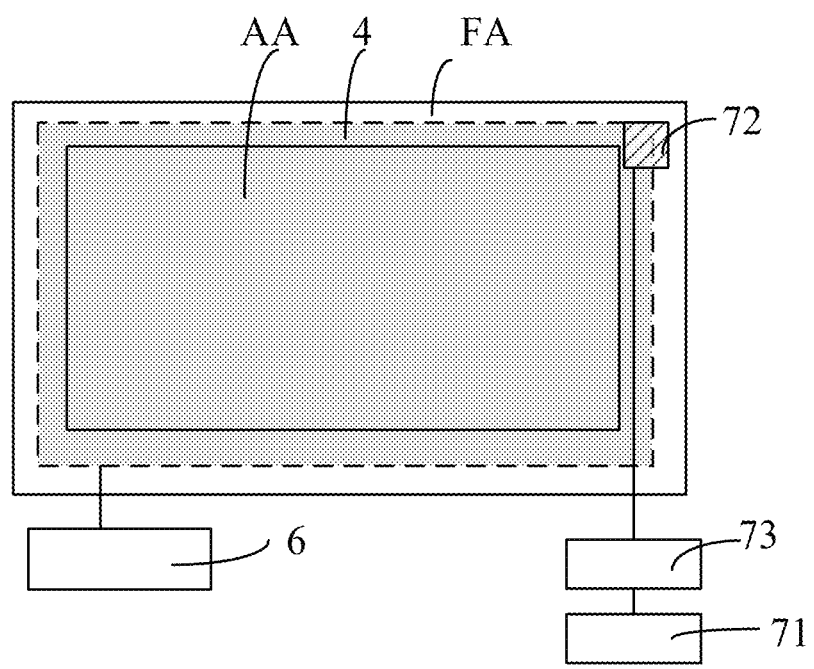
FIG. 27 is a schematic structural diagram of a display module according to an exemplary embodiment of the present disclosure.

As shown in FIGS. 26 and 27, the present disclosure further provides a display module including the display panel provided in any of above embodiments. The display module further includes a temperature detection circuit. The temperature detection circuit includes a current input-output unit 71 and a temperature sensing unit 72. The current input-output unit 71 is connected to a current switch control terminal G1, a current input terminal In, a first node N1 and a current output terminal Out. The current input-output unit 71 is configured to input current through the current input terminal, allow the current to flow through the first node, and output the current through the current output terminal, under a switch control signal from the current switch control terminal G1. The temperature sensing unit 72 is connected to the first node N1, and the temperature sensing unit 72 is integrated to the display panel and configured to generate leakage current. The temperature sensing unit 72 includes at least one PIN diode.

In some embodiments, the temperature sensing unit 72 is integrated to the display panel, which may sense the temperature of the display panel more accurately, and improve the accuracy of the temperature measurement in the display panel. In some embodiments, the temperature sensing unit 72 may be located in the peripheral area FA of the display panel, and the number of the temperature sensing unit 72 may be multiple, which is not limited in the present disclosure. The temperature sensing unit 72 includes a PIN diode, and turned-on current of the PIN diode varies with the change in temperature. When the current input-output unit 71 is turned on under the control of the current switch control terminal G1, the current is input from the current input terminal In, and when the current passes through the first node N1, leakage current may be generated due to the existence of the PIN diode, so that the current output by the current output terminal Out is different from the current input by the current input terminal In. The leakage current generated by the PIN diode may be obtained through measurement of the current difference between the two, and then according to the corresponding relationship between the leakage current and temperature, the temperature of the display panel may be obtained.

In some embodiments of the present disclosure, the current input-output unit 71 includes a first transistor T1 and a second transistor T2. A first electrode of the first transistor T1 is connected to the current input terminal In, both a second electrode of the first transistor T1 and a first electrode of the second transistor T2 are connected to the first node N1, a second electrode of the second transistor T2 is connected to the current output terminal Out, and both a gate of the first transistor T1 and a gate of the second transistor T2 are connected to the current switch control terminal G1.

In some embodiments of the present disclosure, the first electrode of the transistor may be the source or the drain, and the second electrode may be the drain or the source. The first transistor T1 and second transistor T2 employed may be P-type transistors or N-type transistors, as long as the electrodes of the transistors of the selected type are connected with reference to the electrodes of the corresponding transistors in embodiments of the present disclosure, and the corresponding high voltage or low voltage are supplied by the corresponding voltage terminals. For example, for an N-type transistor, its input terminal is the drain while the output terminal is the source, and its control terminal is the gate; and for a P-type transistor, its input terminal is the source while the output terminal is the drain, and its control terminal is the gate. For different types of transistors, the levels of the control signals at the control terminals are also different. For example, for an N-type transistor, when the control signal is at a high level, the N-type transistor is in a turned-on state; while when the control signal is at a low level, the N-type transistor is in a turned-off state. For a P-type transistor, when the control signal is at a low level, the P-type transistor is in a turned-on state; while when the control signal is at a high level, the P-type transistor is in a turned-on state. In some embodiments, the first transistor T1 and the second transistor T2 are N-type transistors.

The temperature sensing unit 72 includes at least one PIN diode. When the number of PIN diodes is multiple, the plurality of PIN diodes are connected in parallel. The first terminal of the PIN diode is connected to the first node N1, and the second terminal of the PIN diode is connected to a first supply voltage terminal VSS. The first supply voltage terminal VSS may input first supply voltage Vss. In some embodiments, the temperature sensing unit 72 includes a first PIN diode D1 and a second PIN diode D2, both the first terminal of the first PIN diode D1 and the first terminal of the second PIN diode D2 are connected to the first node N1, and both the second terminal of the first PIN diode D1 and the second terminal of the second PIN diode D2 are connected to the first supply voltage terminal VSS.

In some embodiments of the present disclosure, the temperature detection circuit further includes a first control unit 73. The first control unit 73 is connected to the signal control terminal GATE, the first supply voltage terminal VSS, a second supply voltage VDD and the current switch control terminal G1. The first control unit 73 is configured to output the voltage of the first supply voltage terminal VSS or the second supply voltage terminal VDD to the current switch control terminal G1 under the control signal from the signal control terminal GATE. The second supply voltage terminal VDD may input a second supply voltage Vdd. The first control unit 73 includes at least two inverters, an output terminal of a $k^{th}$ stage inverter is connected to an input terminal of a $(k+1)^{th}$ stage inverter, an input terminal of the first stage inverter is connected to the signal control terminal GATE, and an output terminal of the last stage inverter is connected to the current switch control terminal G1, wherein k is a positive integer equal to or greater than 1.

In some embodiments, the first control unit 73 includes two inverters, each of the two inverters is a CMOS inverter, which includes a PMOS transistor and an NMOS transistor connected in series. The phase difference between the signal input at the input terminal and the signal output at the output terminal of each inverter is 180 degrees. For example, when the signal input through the input terminal of the first stage inverter is a high-level signal, the signal output through its output terminal is a low-level signal, i.e., the signal input through the input terminal of the second stage inverter is a low-level signal, while the signal output is a high-level signal. At this time, the two transistors of the current input-output unit 71 are turned on, so that the temperature detection of the display panel may be completed.

In some embodiments of the present disclosure, the temperature detection circuit further includes a second control unit 74 connected to the output end of one of the inverters in the first control unit 73, the first supply voltage terminal VSS and the first terminal of the PIN diode. The second control unit 74 is configured to apply the first supply voltage of the first supply voltage terminal VSS to the first terminal of the PIN diode under the control signal from the output terminal of the inverter connected thereto. The second control unit 74 includes a third transistor T3. The control terminal of the third transistor T3 is connected to the output terminal of the first stage inverter, the first electrode of the third transistor T3 is connected to the first supply voltage terminal VSS, and the second electrode is connected to the first terminal of the PIN diode. In some embodiments, the third transistor T3 is an N-type transistor.

In some embodiments of the present disclosure, when the temperature detection need to be performed on the display panel, a high-level signal may be input to the input terminal of the first stage inverter, and at this time, the signal output by the output terminal of the first stage inverter is a low-level signal. The signal output by the output terminal of the second stage inverter is a high-level signal, and at this time, the two transistors of the current input-output unit 71 are turned on. The signal input from the control terminal of the third transistor T3 is a low level signal, the third transistor T3 is turned off, the voltage of the first terminal of the PIN diode is equal to the voltage of the first node N1, and the second terminal voltage of the PIN diode is Vss. The current is input from the current input terminal In, and when current passes through the first node N1, the leakage current may be generated due to the existence of the PIN diode, so that the current output by the current output terminal Out is different from the current input by the current input terminal In. The leakage current generated by the PIN diode may be obtained through measurement of the current difference between the two, and then according to the corresponding relationship between the leakage current and the temperature, the temperature of the display panel is obtained.

When the temperature detection does not need to be performed on the display panel, a low-level signal may be input to the input terminal of the first stage inverter, and t this time, the signal output through the output terminal of the first stage inverter is a high-level signal, and the signal output through the output terminal of the second stage inverter is a low-level signal. At this time, the two transistors of the current input-output unit 71 are turned off, and the current input-output unit 71 is turned off. At the same time, the signal input from the control terminal of the third transistor T3 is a high level signal, and the third transistor T3 is turned on and the first supply voltage Vss is applied to the first end of the PIN diode. At this time, no voltage is applied to both terminals of the PIN diode, and the entire temperature detection circuit is in a non-operating state.

In some embodiments of the present disclosure, the display module further includes a driving chip and a circuit board, the driving chip is connected with the display panel, the circuit board is connected with the driving chip, the first control unit 73 may be provided on driving chip, and the input-output unit 71 may be provided on the circuit board. Of course, the first control unit 73 and/or the current input-output unit 71 may also be integrated to the display panel, which is not limited in the present disclosure.

Embodiments of the present disclosure also provide a display device including the display module according to any embodiment of the present disclosure. The display device may be any product or component with a display function such as a mobile phone, a tablet computer, a TV, a monitor, a notebook computer, a digital photo frame, a navigator and the like.

It should be understood that, the present disclosure does not limit its application to the detailed structure and arrangement of components set forth in the present description. The present disclosure can have other embodiments and can be implemented and carried out in various manners. Variations and modifications of the foregoing fall within the scope of the present disclosure. It should be understood that, the present disclosure disclosed and defined in this description extends to all alternative combinations of two or more of the individual features mentioned or evident in the text and/or figures. All of these different combinations constitute various alternative aspects of the present disclosure. The embodiments of the present description explain the best mode known for carrying out the present disclosure, and will enable any person skilled in the art to utilize the present disclosure.

What is claimed is:

1. A display module comprising a display panel and a temperature detection circuit,
   wherein the display panel comprises:
   a first base substrate and a second base substrate arranged oppositely;
   a liquid crystal layer and a plurality of conductive layers, wherein the liquid crystal layer and the plurality of conductive layers are located between the first base substrate and the second base substrate; and
   a plurality of heating elements, wherein the plurality of heating elements are distributed in at least one of the conductive layers; and
   wherein the temperature detection circuit comprises:
   a temperature sensing unit integrated in a peripheral area of the display panel, and configured to generate leakage current; and
   a current input-output unit connected to the temperature sensing unit, and configured to obtain the leakage current, to obtain a temperature of the display panel according to a corresponding relationship between the leakage current and the temperature.

2. The display module according to claim 1, wherein the heating elements are distributed in at least two of the conductive layers, and among the heating elements distributed in different conductive layers, a heating element in at least one of the conductive layers is connected in parallel to a heating element in another one of the conductive layers.

3. The display module according to claim 1, wherein the plurality of conductive layers comprise:
   a first conductive layer group comprising at least one of the conductive layers, wherein the first conductive layer group is arranged on a side of the liquid crystal layer close to the first base substrate; and
   a second conductive layer group comprising at least one of the conductive layers, wherein the second conductive layer group is arranged on a side of the liquid crystal layer away from the first base substrate;
   wherein the heating elements are distributed in the first conductive layer group and/or the second conductive layer group.

4. The display module according to claim 1, wherein the display panel further comprises:
   a coupling lead, wherein the coupling lead is distributed in at least one of the plurality of conductive layers, and is located in the peripheral area; and
   a heating control unit configured to control turned-on or turned-off of the heating elements, wherein the coupling lead connects the heating elements and the heating control unit.

5. The display module according to claim 4, wherein the plurality of conductive layers comprise a first conductive layer, a second conductive layer, a third conductive layer, a fourth conductive layer, a fifth conductive layer and a sixth conductive layer arranged in sequence in a direction away from the first base substrate; wherein
   the first conductive layer comprises a shielding structure; the second conductive layer comprises an active region of a transistor; the third conductive layer comprises a gate of the transistor; the fourth conductive layer comprises a source and a drain of the transistor; the fifth conductive layer comprises a first electrode; the sixth conductive layer comprises a second electrode; and the second electrode and the first electrode are configured to form an electric field for driving the liquid crystal layer; and
   wherein the heating elements are distributed in at least one of the conductive layers of six conductive layers composed of the first conductive layer, the second conductive layer, the third conductive layer, the fourth conductive layer, the fifth conductive layer and the sixth conductive layer.

6. The display module according to claim 5, wherein the heating elements are distributed in at least two of the conductive layers of the six conductive layers composed of the first conductive layer, the second conductive layer, the third conductive layer, the fourth conductive layer, the fifth conductive layer and the sixth conductive layer, and a heating element in at least one of the conductive layers is connected in parallel to a heating element in another one of the conductive layers.

7. The display module according to claim 5, wherein the plurality of conductive layers further comprise:
   a seventh conductive layer arranged between any two of the six conductive layers composed of the first conductive layer, the second conductive layer, the third conductive layer, the fourth conductive layer, the fifth conductive layer and the sixth conductive layer, or arranged on a side of the first conductive layer close to the first base substrate;
   wherein at least part of the heating elements is distributed in the seventh conductive layer, and the at least part of the heating elements is connected in parallel to a heating element in at least one of the conductive layers of the six conductive layers composed of the first conductive layer, the second conductive layer, the third conductive layer, the fourth conductive layer, the fifth conductive layer and the sixth conductive layer.

8. The display module according to claim 5, wherein the plurality of conductive layers further comprise:
   an eighth conductive layer arranged on a side of the liquid crystal layer away from the first base substrate;
   wherein at least part of the heating elements is distributed in the eighth conductive layer, and the at least part of the heating elements is connected in parallel to a heating element in at least one of the six conductive layers composed of the first conductive layer, the second conductive layer, the third conductive layer, the fourth conductive layer, the fifth conductive layer and the sixth conductive layer.

9. The display module according to claim 8, further comprising:
   sealant sealed between the first base substrate and the second base substrate, wherein a conductive element is provided in the sealant, and a heating element distributed in the eighth conductive layer is connected to the heating control unit through the conductive element.

10. The display module according to claim 5, wherein the display panel comprises a plurality of data lines and a plurality of scan lines, and the scan lines and the data lines intersect with each other and define a plurality of pixel areas; and wherein
   the plurality of heating elements extend in an extension direction of the scan lines, and are arranged in an arrangement direction of the scan lines; or
   the plurality of the heating elements extend in an extension direction of the data lines, and are arranged in an arrangement direction of the data lines.

11. The display module according to claim 10, further comprising:
   a color film layer arranged between the liquid crystal layer and the second base substrate, wherein the color film layer comprises a shielding portion and a plurality of filter portions defined by the shielding portion, and the filter portions and the pixel areas are arranged in a one-to-one correspondence in a direction perpendicular to the first base substrate;
   wherein orthographic projections of the heating elements on the first base substrate are located within an orthographic projection of the shielding portion on the first base substrate.

12. The display module according to claim 10, wherein among a plurality of heating elements distributed in the same conductive layer, at least part of the heating elements are connected in parallel or in series to form a heating unit.

13. The display module according to claim 12, wherein among the plurality of heating elements distributed in the same conductive layer, at least every two of the heating elements are connected in parallel or in series.

14. A display device comprising the display module according to claim 1.

15. The display module according to claim 1, wherein the current input-output unit comprises a current switch control terminal, a current input terminal, a first node and a current output terminal, and wherein the current input-output unit is connected to the temperature sensing unit at the first node, and the current input-output unit is configured to input current through the current input terminal, allow the current to flow through the first node, and output the current through the current output terminal, under a switch control signal from the current switch control terminal, and the leakage current is obtained through measurement of current difference between the current input terminal and the current output terminal.

16. The display module according to claim 15, wherein the current input-output unit further comprise a first transistor and a second transistor, a first electrode of the first transistor is connected to the current input terminal, a second electrode of the first transistor and a first electrode of the second transistor are both connected to the first node, a second electrode of the second transistor is connected to the current output terminal, and a gate of the first transistor and a gate of the second transistor are both connected to the current switch control terminal.

17. The display module according to claim 16, wherein the temperature sensing unit comprises at least one PIN diode, a first terminal of the PIN diode is connected to the first node, and a second terminal of the PIN diode is connected to a first supply voltage terminal.

18. The display module according to claim 16, wherein the temperature sensing unit comprises multiple PIN diodes, first terminals of the multiple PIN diodes are connected to the first node, and second terminals of the multiple PIN diodes are connected to a first supply voltage terminal.

19. The display module according to claim 17, wherein the temperature detection circuit further comprises:
   a first control unit connected to a signal control terminal, the first supply voltage terminal, a second supply voltage terminal and the current switch control terminal, wherein the first control unit is configured to output a voltage of the first supply voltage terminal or the second supply voltage terminal to the current switch control terminal under a control signal from the signal control terminal; and
   wherein the first control unit comprises at least two inverters, an output terminal of a $k^{th}$ stage inverter is connected to an input terminal of a $(k+1)^{th}$ stage inverter, an input terminal of the first stage inverter is connected to the signal control terminal, and an output terminal of the last stage inverter is connected to the current switch control terminal, wherein k is a positive integer greater than or equal to 1.

20. The display module according to claim 19, wherein the temperature detection circuit further comprises:
   a second control unit connected to an output terminal of one of the inverters in the first control unit, the first supply voltage terminal and the first terminal of the at least one PIN diode, wherein the second control unit is configured to apply a first supply voltage of the first supply voltage terminal to the first terminal of the at least one PIN diode under a control signal from an output terminal of an inverter connected thereto.

* * * * *